US010986005B2

(12) United States Patent
Bernat et al.

(10) Patent No.: US 10,986,005 B2
(45) Date of Patent: Apr. 20, 2021

(54) TECHNOLOGIES FOR DYNAMICALLY MANAGING RESOURCES IN DISAGGREGATED ACCELERATORS

(71) Applicant: Intel Corporation, Santa Clara, CA (US)

(72) Inventors: Francesc Guim Bernat, Barcelona (ES); Susanne M. Balle, Hudson, NH (US); Rahul Khanna, Portland, OR (US); Sujoy Sen, Beaverton, OR (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 15/638,855

(22) Filed: Jun. 30, 2017

(65) Prior Publication Data

US 2018/0027062 A1    Jan. 25, 2018

Related U.S. Application Data

(60) Provisional application No. 62/365,969, filed on Jul. 22, 2016, provisional application No. 62/376,859, (Continued)

(51) Int. Cl.
*H04L 12/26* (2006.01)
*G06F 16/901* (2019.01)
(Continued)

(52) U.S. Cl.
CPC ............ *H04L 43/08* (2013.01); *G02B 6/3882* (2013.01); *G02B 6/3893* (2013.01);
(Continued)

(58) Field of Classification Search
CPC ...... H04Q 11/0005; H04Q 1/04; H04Q 11/00; H04Q 11/0003; H04Q 11/0062;
(Continued)

(56) References Cited

U.S. PATENT DOCUMENTS 8,762,916 B1 *   6/2014   Kathail ................... G06F 30/30
                                                                 716/116
8,990,351 B2 *   3/2015   Isaksson ............. H04L 47/2416
                                                                 709/219

(Continued)

*Primary Examiner* — Joshua D Taylor
*Assistant Examiner* — Adil Ocak
(74) *Attorney, Agent, or Firm* — Compass IP Law PC

(57) ABSTRACT

Technologies for dynamically managing resources in disaggregated accelerators include an accelerator. The accelerator includes acceleration circuitry with multiple logic portions, each capable of executing a different workload. Additionally, the accelerator includes communication circuitry to receive a workload to be executed by a logic portion of the accelerator and a dynamic resource allocation logic unit to identify a resource utilization threshold associated with one or more shared resources of the accelerator to be used by a logic portion in the execution of the workload, limit, as a function of the resource utilization threshold, the utilization of the one or more shared resources by the logic portion as the logic portion executes the workload, and subsequently adjust the resource utilization threshold as the workload is executed. Other embodiments are also described and claimed.

29 Claims, 27 Drawing Sheets

Related U.S. Application Data filed on Aug. 18, 2016, provisional application No. 62/427,268, filed on Nov. 29, 2016.

(51) Int. Cl.

| | |
|---|---|
| H04B 10/25 | (2013.01) |
| G02B 6/38 | (2006.01) |
| G02B 6/42 | (2006.01) |
| G02B 6/44 | (2006.01) |
| G06F 1/18 | (2006.01) |
| G06F 1/20 | (2006.01) |
| G06F 3/06 | (2006.01) |
| G06F 8/65 | (2018.01) |
| G06F 9/30 | (2018.01) |
| G06F 9/4401 | (2018.01) |
| G06F 9/54 | (2006.01) |
| G06F 12/109 | (2016.01) |
| G06F 12/14 | (2006.01) |
| G06F 13/16 | (2006.01) |
| G06F 13/40 | (2006.01) |
| G08C 17/02 | (2006.01) |
| G11C 5/02 | (2006.01) |
| G11C 7/10 | (2006.01) |
| G11C 11/56 | (2006.01) |
| G11C 14/00 | (2006.01) |
| H03M 7/30 | (2006.01) |
| H03M 7/40 | (2006.01) |
| H04L 12/24 | (2006.01) |
| H04L 12/931 | (2013.01) |
| H04L 12/947 | (2013.01) |
| H04L 29/08 | (2006.01) |
| H04L 29/06 | (2006.01) |
| H04Q 11/00 | (2006.01) |
| H05K 7/14 | (2006.01) |
| G06F 9/38 | (2018.01) |
| G06F 9/50 | (2006.01) |
| H04L 12/851 | (2013.01) |
| H04L 12/811 | (2013.01) |
| H05K 5/02 | (2006.01) |
| H04W 4/80 | (2018.01) |
| G06Q 10/08 | (2012.01) |
| G06Q 10/00 | (2012.01) |
| G06Q 50/04 | (2012.01) |
| H04L 12/911 | (2013.01) |
| B25J 15/00 | (2006.01) |
| B65G 1/04 | (2006.01) |
| H05K 7/20 | (2006.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |

(52) U.S. Cl.
CPC ......... *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01); *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F*

*2212/402* (2013.01); *G06F 2212/7207* (2013.01); *G06Q 10/06* (2013.01); *G06Q 10/06314* (2013.01); *G06Q 10/087* (2013.01); *G06Q 10/20* (2013.01); *G06Q 50/04* (2013.01); *G07C 5/008* (2013.01); *G08C 2200/00* (2013.01); *G11C 5/06* (2013.01); *H03M 7/30* (2013.01); *H03M 7/3084* (2013.01); *H03M 7/40* (2013.01); *H03M 7/4031* (2013.01); *H03M 7/6005* (2013.01); *H03M 7/6023* (2013.01); *H04B 10/25* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/12* (2013.01); *H04L 41/147* (2013.01); *H04L 41/5019* (2013.01); *H04L 43/065* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/555* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/34* (2013.01); *H04Q 1/04* (2013.01); *H04Q 11/00* (2013.01); *H04Q 11/0005* (2013.01); *H04Q 11/0062* (2013.01); *H04Q 11/0071* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/023* (2013.01); *H04W 4/80* (2018.02); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1485* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20736* (2013.01); *H05K 7/20745* (2013.01); *H05K 7/20836* (2013.01); *H05K 13/0486* (2013.01); *H05K 2201/066* (2013.01); *H05K 2201/10121* (2013.01); *H05K 2201/10159* (2013.01); *H05K 2201/10189* (2013.01); *Y02D 10/00* (2018.01); *Y02P 90/30* (2015.11); *Y04S 10/50* (2013.01); *Y04S 10/52* (2013.01); *Y10S 901/01* (2013.01)

(58) Field of Classification Search
CPC . H04Q 11/0071; G06F 16/9014; G06F 1/183; G06F 1/20; G06F 3/061; G06F 3/0611; G06F 3/0613; G06F 3/0616; G06F 3/0619; G06F 3/0625; G06F 3/0631; G06F 3/0638; G06F 3/064; G06F 3/0647; G06F 3/0653; G06F 3/0655; G06F 3/0658; G06F 3/0659; G06F 3/0664; G06F 3/0665; G06F 3/067; G06F 3/0673; G06F 3/0679; G06F 3/0683; G06F 3/0688; G06F 3/0689; G06F 8/65; G06F 9/30036; G06F 9/3887; G06F 9/4401; G06F 9/5016; G06F 9/5044; G06F 9/505; G06F 9/5072; G06F 9/5077; G06F 9/544; G06F 11/141; G06F 11/3141; G06F 12/0862; G06F 12/0893; G06F 12/10; G06F 12/109; G06F 12/1408; G06F 13/161; G06F 13/1668; G06F 13/1694; G06F 13/4022; G06F 13/4068; G06F 13/409; G06F 13/42; G06F 13/4282; G06F 15/8061; B25J 15/0014; B65G 1/0492; G02B 6/3882; G02B 6/3893; G02B 6/3897; G02B 6/4292; G02B 6/4452; G05D 23/1921; G05D 23/2039; G06Q 10/06; G06Q 10/06314; G07C 5/008; G08C 17/02; G11C 5/02; G11C 5/06; G11C 7/1072; G11C 11/56; G11C 14/0009; H03M 7/30; H03M 7/3084; H03M 7/3086; H03M 7/40; H03M 7/401; H03M 7/4056; H03M 7/4081; H03M 7/6005; H03M 7/6023; H03M 10/2504; H04L 9/0643; H04L 9/14; H04L 9/3247; H04L 9/3263; H04L 12/2809; H04L 29/12009; H04L 41/024; H04L 41/046; H04L 41/0813; H04L 41/082; H04L 41/0896; H04L 41/145; H04L 41/147; H04L 43/08; H04L 43/0817; H04L 43/0876; H04L 43/0894; H04L 43/16; H04L 45/02; H04L 45/52; H04L 47/24; H04L 47/38; H04L 47/765; H04L 47/782; H04L 47/805; H04L 47/82; H04L 47/823; H04L 49/00; H04L 49/15; H04L 49/25; H04L 49/357; H04L 49/45; H04L 49/555; H04L 67/02; H04L 67/10; H04L 67/1004; H04L 67/1008; H04L 67/1012; H04L 67/1014; H04L 67/1029; H04L 67/1034; H04L 67/1097; H04L 67/12; H04L 67/16; H04L 67/306; H04L 67/34; H04L 69/04; H04L 69/329; H04W 4/023; H05K 1/0203; H05K 1/181; H05K 5/0204; H05K 7/1418; H05K 7/1421; H05K 7/1422; H05K 7/1442; H05K 7/1447; H05K 7/1461; H05K 7/1487; H05K 7/1489; H05K 7/1491; H05K 7/1492; H05K 7/1498; H05K 7/2039; H05K 7/20709; H05K 7/20727; H05K 7/20736; H05K 7/20745; H05K 7/20836; H05K 13/0486

See application file for complete search history.

(56) References Cited

U.S. PATENT DOCUMENTS

| | | | |
|---|---|---|---|
| 10,461,774 B2 | 10/2019 | Balle et al. | |
| 10,616,668 B2 | 4/2020 | Balle et al. | |
| 2012/0233488 A1* | 9/2012 | Burchard | G06F 1/3228 713/500 |
| 2015/0033134 A1* | 1/2015 | Bragstad | H04L 43/16 715/736 |
| 2017/0220499 A1* | 8/2017 | Gray | G06F 13/36 |

* cited by examiner

TECHNOLOGIES FOR DYNAMICALLY MANAGING RESOURCES IN DISAGGREGATED ACCELERATORS

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Typical architectures for accelerator devices such as field programmable gate arrays (FPGAs), cryptography accelerators, graphics accelerators, and/or compression accelerators (referred to herein as "accelerators" or "accelerator resources") capable of accelerating the execution of a set of operations in a workload (e.g., processes, applications, services, etc.) may allow static assignment of specified amounts of shared resources of the accelerator device (e.g., high bandwidth memory, data storage, etc.) among different portions of the logic (e.g., circuitry) of the accelerator device. Each logic portion may execute a separate set of operations to be accelerated, such as on behalf of different customers of a cloud data center. The resource needs of the logic portions may change as their workloads are executed, such that while a particular logic portion may be allocated 60% of the available high bandwidth memory, it only uses 30% of the high bandwidth memory during certain phases of the workload. During those phases, other logic portions of the accelerator device that might benefit from using more of the high bandwidth memory are prevented from doing so, as the allocations are statically defined. Changing the allocation of shared resources among the logic portions of the accelerator device typically involves stopping the execution of the workloads and reconfiguring the logic portions to use different amounts of the shared resources, and then resuming operation of the workloads. The reconfiguration process may add significant delays to the execution time of the workloads, potentially negating the benefits of reallocating the shared resources among the logic portions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
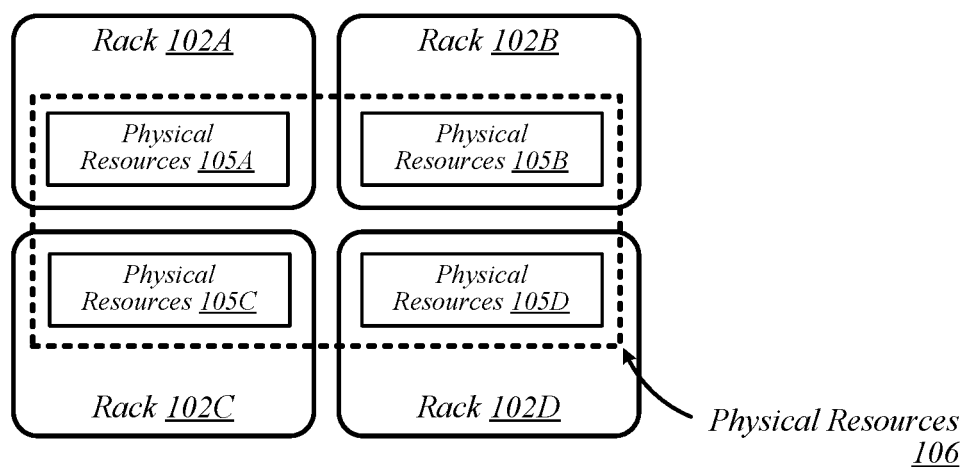
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
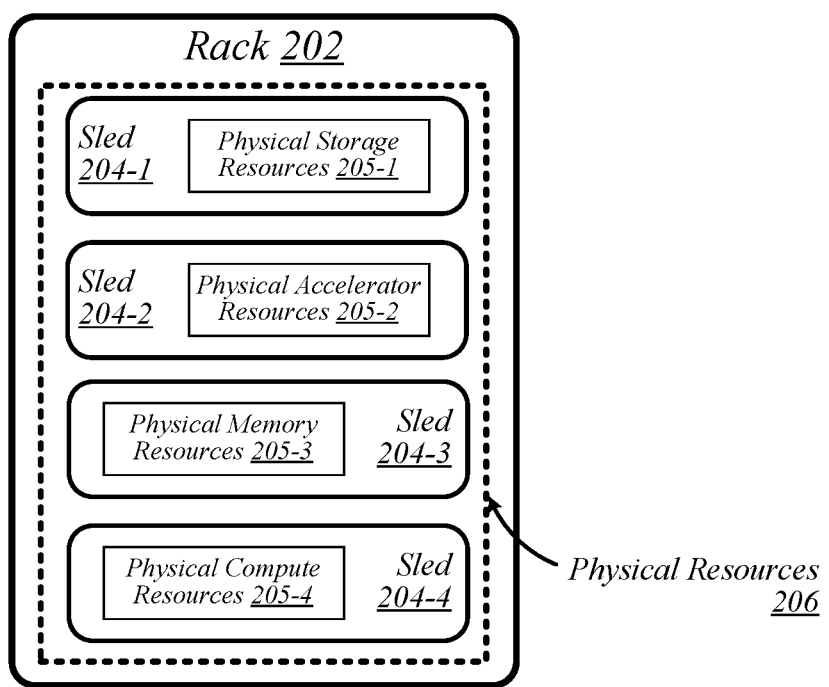
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
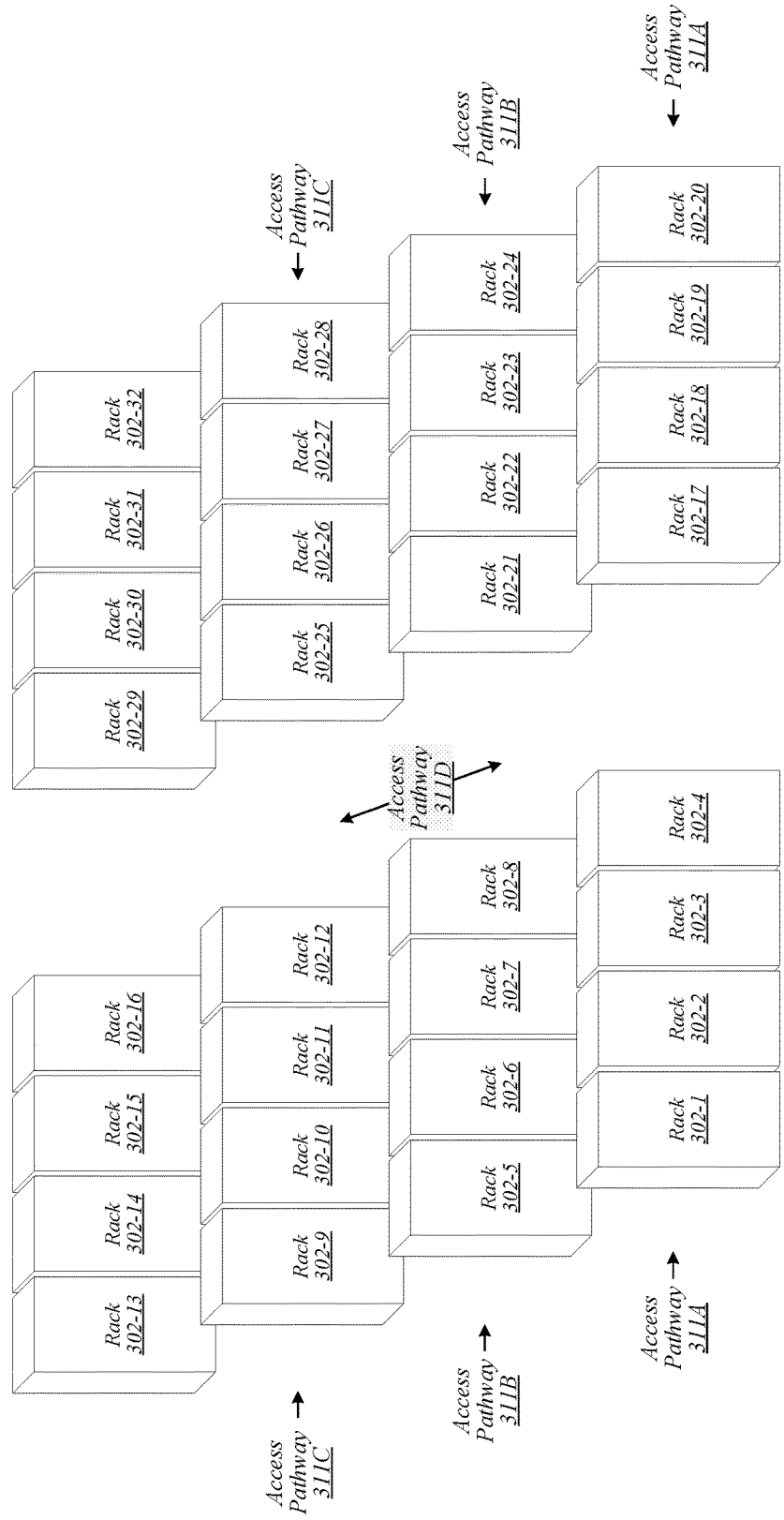
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
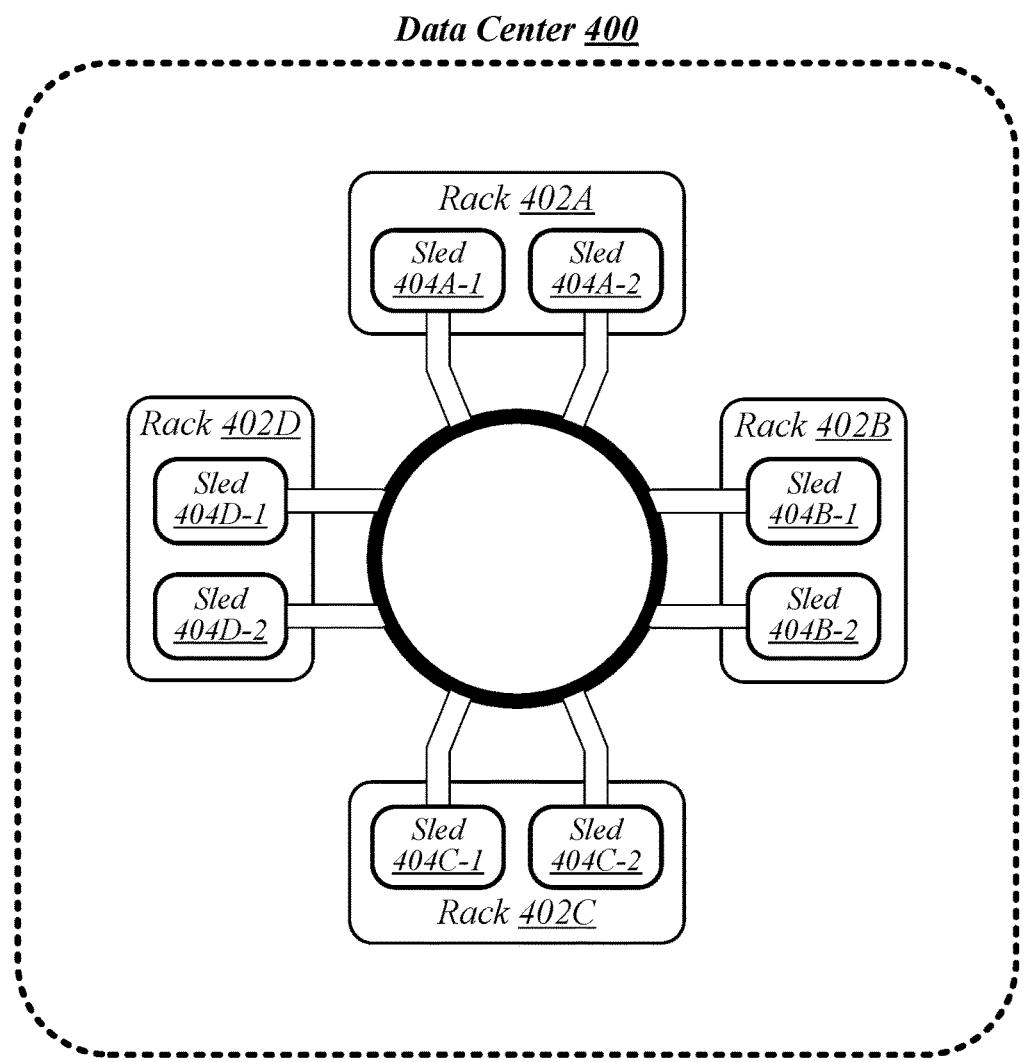
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
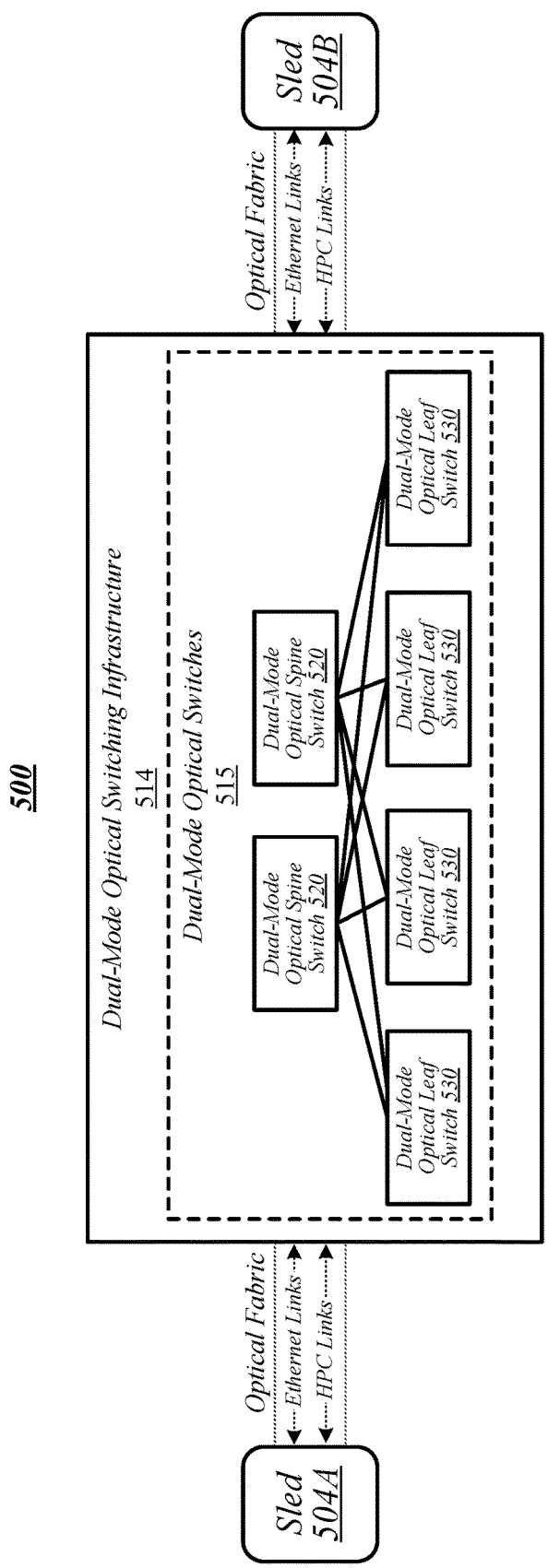
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
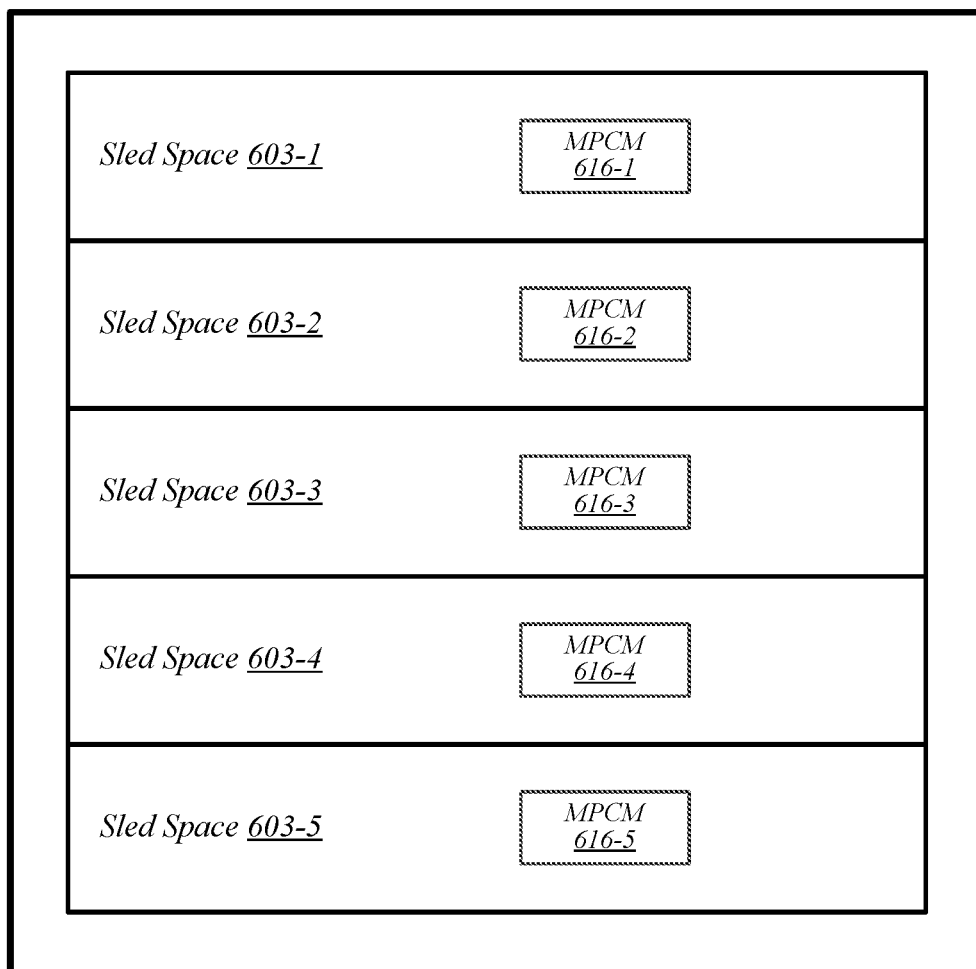
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
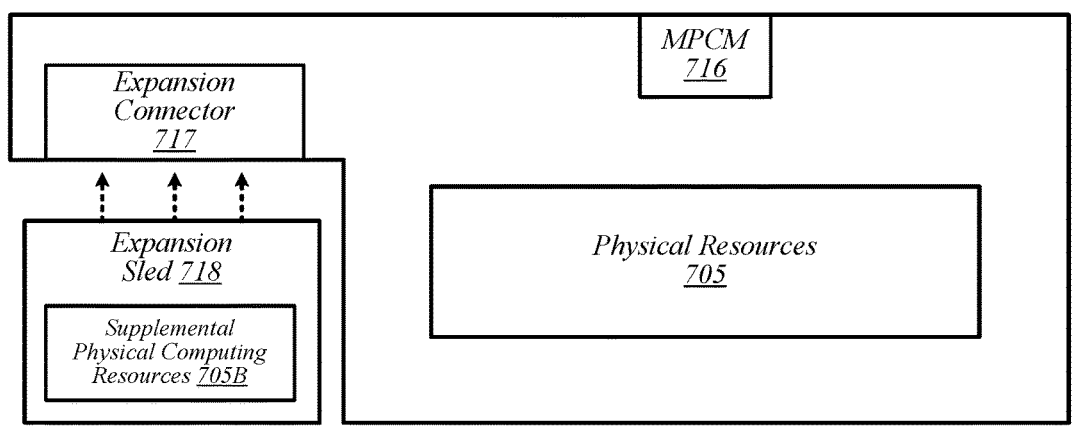
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
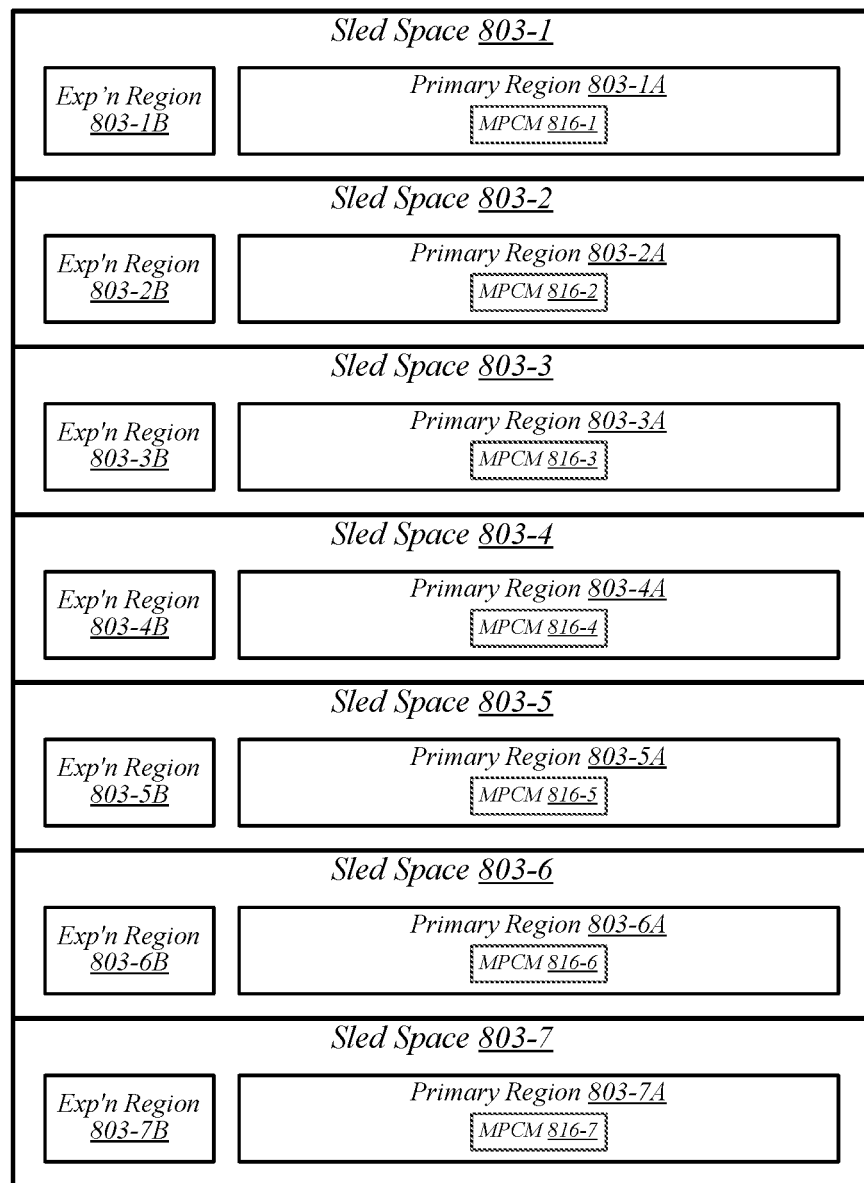
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
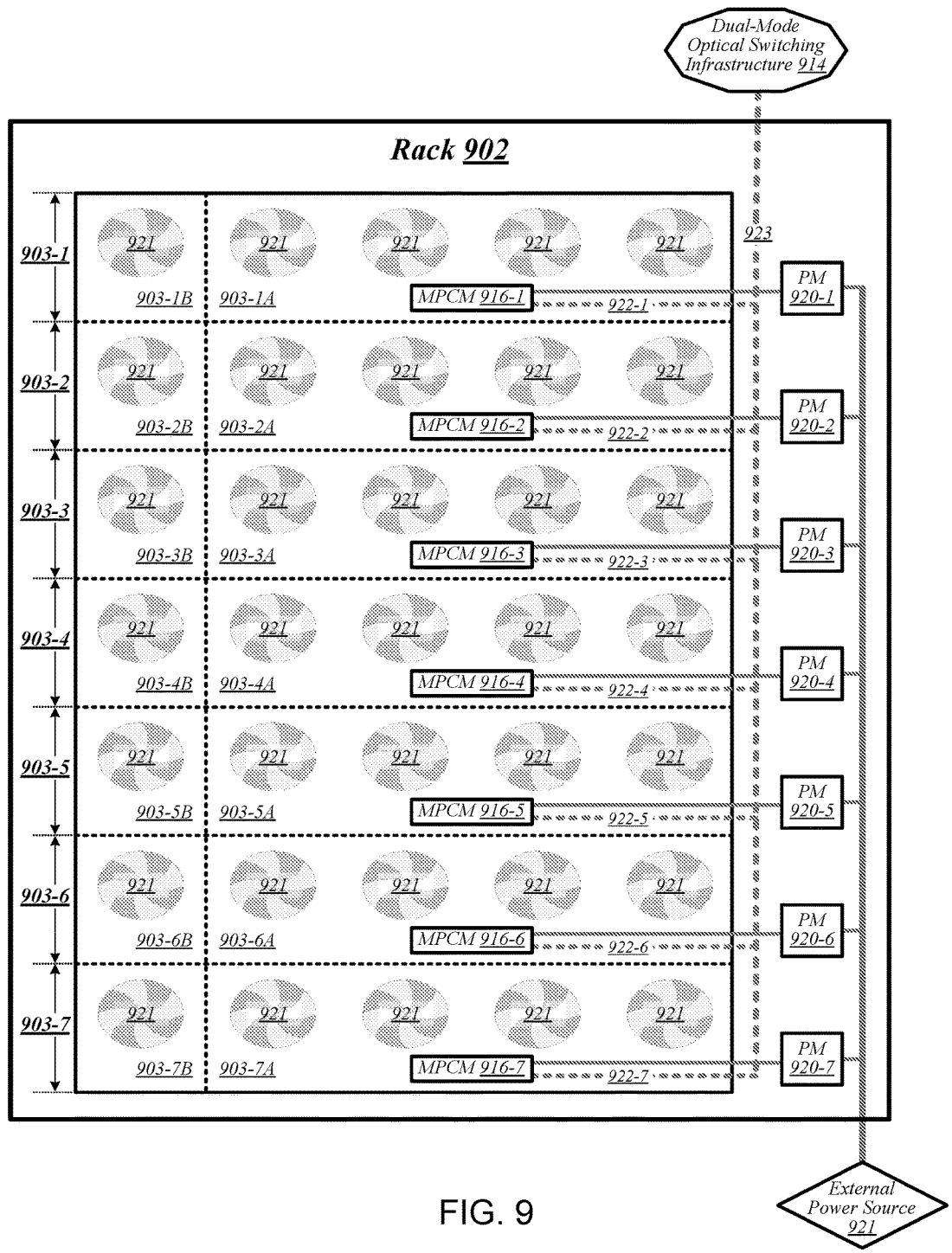
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
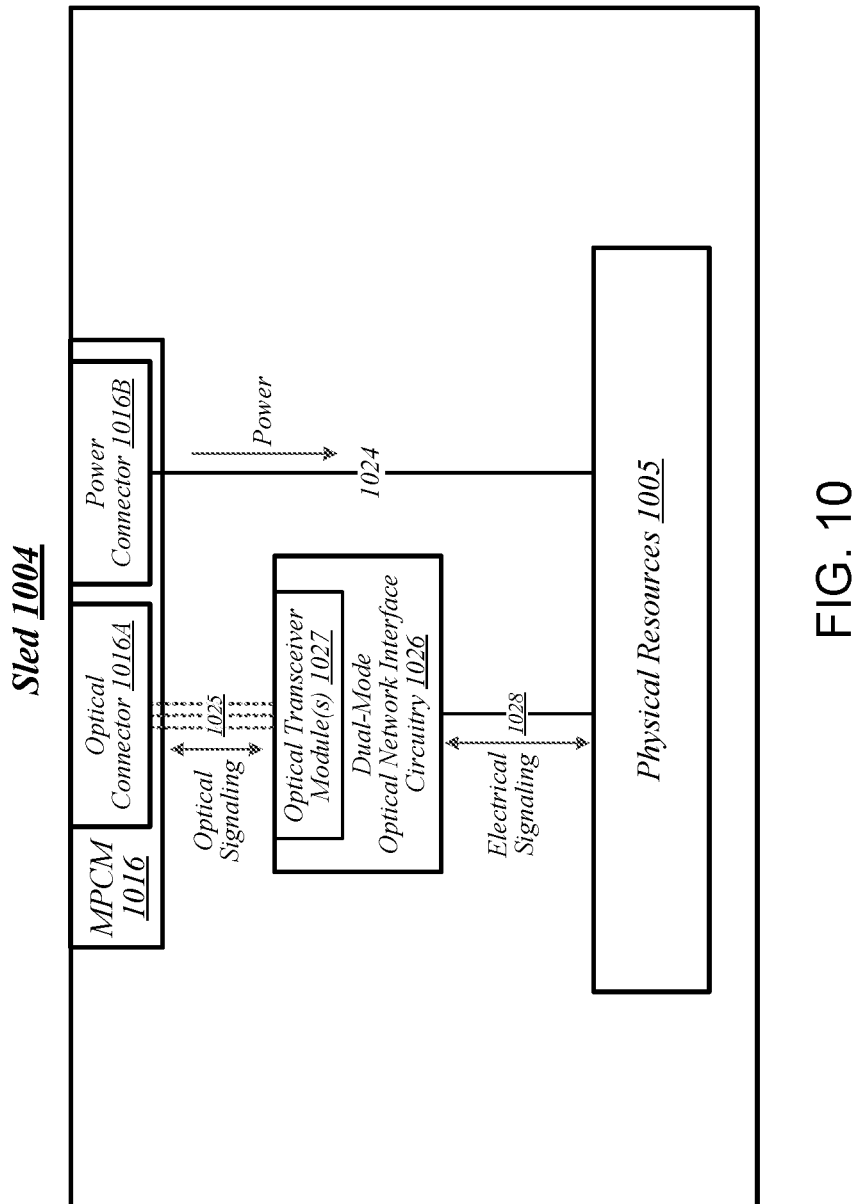
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
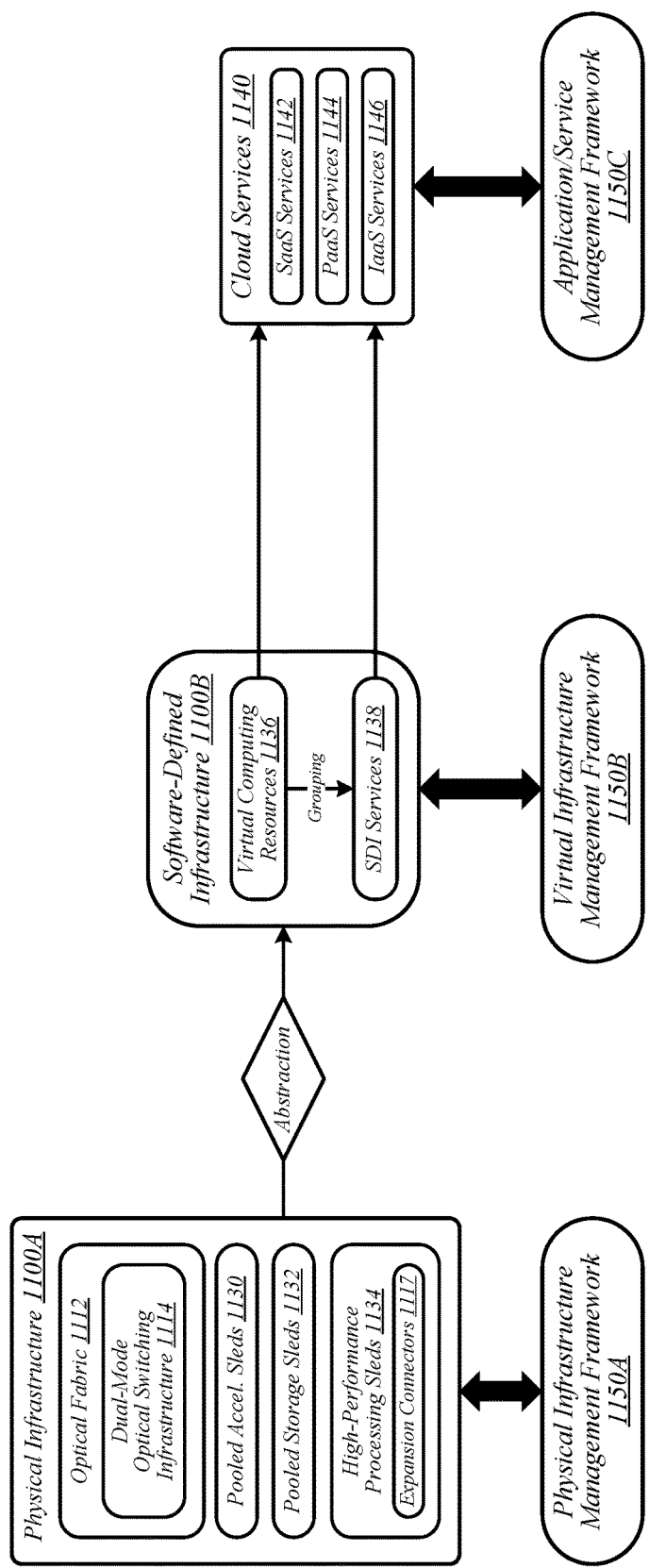
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
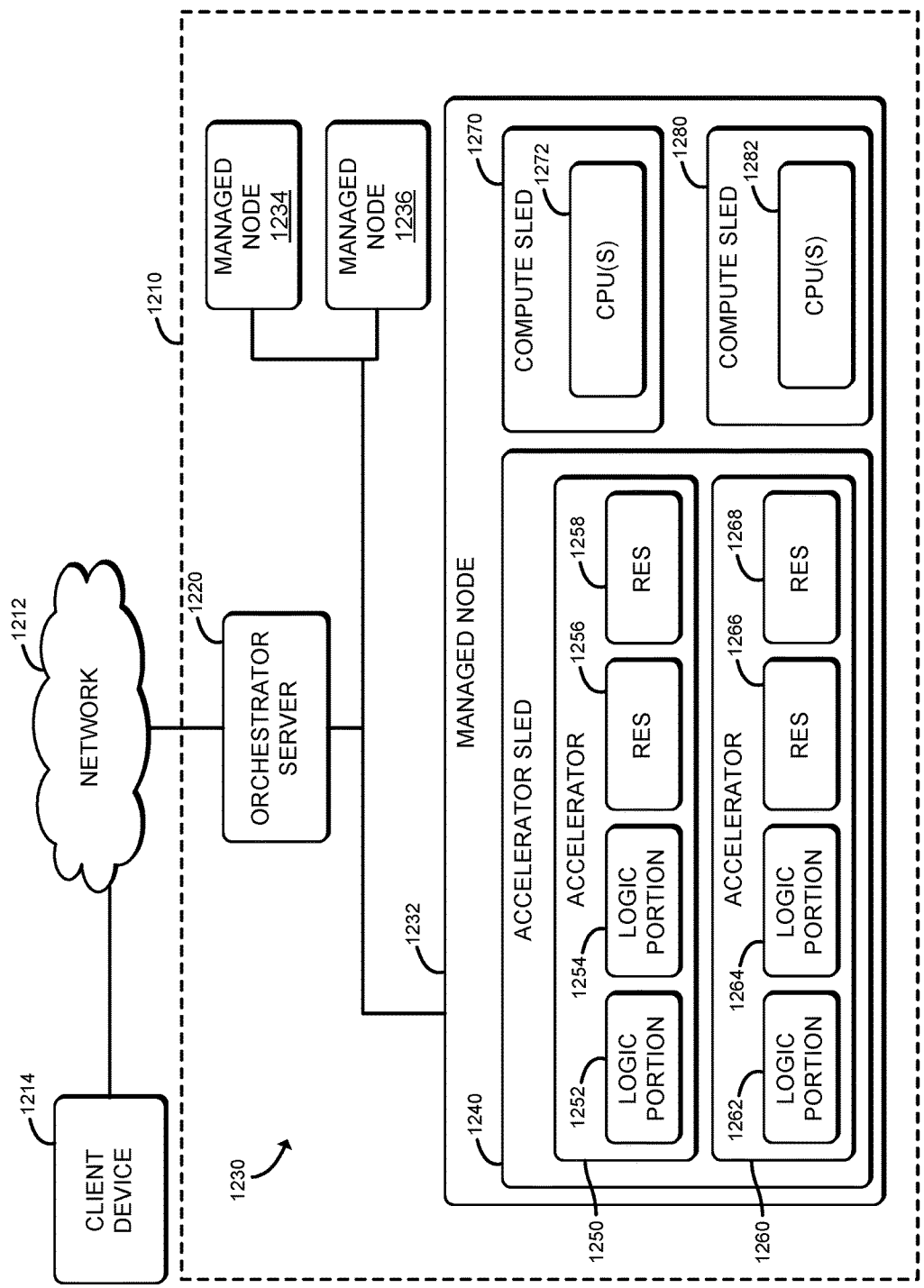
FIG. 12 is a simplified block diagram of at least one embodiment of a system for dynamically allocating shared resources among logic portions of accelerators used execute workloads.

Referring now to FIG. 12, a system 1210 for dynamically allocating shared resources among logic portions of accelerators used to execute workloads may be implemented in accordance with the data centers 100, 300, 400, 1100 described above with reference to FIGS. 1, 3, 4, and 11. In the illustrative embodiment, the system 1210 includes an orchestrator server 1220 in communication with a set of managed nodes 1230. Each managed node 1230 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). In the illustrative embodiment, a managed node 1232 includes accelerators 1250, 1260 of an accelerator sled 1240 and CPUs 1272, 1282 of compute sleds 1270, 1280. As described in more detail herein, the accelerator 1250 includes multiple logic portions 1252, 1254 which may each be embodied as any subset of the logic (e.g., circuitry) of the accelerator 1250 capable of separately executing a workload (e.g., a portion of an application assigned to a corresponding compute sled, such as the compute sled 1270) and utilizing shared resources 1256, 1258, such as memory and data storage, of the accelerator 1250 during the execution of the workload. As such, using the separate logic portions 1252, 1254, the accelerator 1250 may accelerate the execution of separate workloads. Similarly, the accelerator 1260 includes logic portions 1262, 1264 and shared resources 1266, 1268 similar to the corresponding components of the accelerator 1250 described above.

Each managed node 1230 may be established, defined, or "spun up" by the orchestrator server 1220 at the time a workload is to be assigned to the managed node 1230 or at any other time, and may exist regardless of whether any workloads are presently assigned to the managed node 1230. In the illustrative embodiment, the set of managed nodes 1230 includes managed nodes 1232, 1234, and 1236. While three managed nodes 1230 are shown in the set, it should be understood that in other embodiments, the set may include a different number of managed nodes 1230 (e.g., tens of thousands). The system 1210 may be located in a data center and provide storage and compute services (e.g., cloud services) to a client device 1214 that is in communication with the system 1210 through a network 1212. The orchestrator server 1220 may support a cloud operating environment, such as OpenStack, and the managed nodes 1230 may execute one or more applications or processes (i.e., workloads), such as in virtual machines or containers, on behalf of a user of the client device 1214.

As discussed in more detail herein, in operation, in the illustrative embodiment an accelerator (e.g., the accelerator 1250) is configured to execute assigned workloads with the logic portions 1252, 1254 and allocate specified amounts of the shared resources 1256, 1258 to the logic portions 1252, 1254 during the execution of the workloads. Furthermore, during execution of the workloads, the accelerator 1250 is to monitor the actual utilization of the resources allocated to the logic portions 1252, 1254 and report back resource utilization data to another compute device, such as to the orchestrator server 1220, which may, in turn, send the resource utilization data to another compute device, such as the CPU 1272. The CPU 1272 may be executing a workload (e.g., an application) associated with a workload (e.g., a set of operations in the application) executed by one of the logic portions 1252, 1254. In some embodiments, the accelerator 1250 only reports the resource utilization if the resource utilization does not satisfy a threshold (e.g., the utilization falls below the allocated amount of the shared resource by a predefined amount such as 5%). In response, the accelerator 1250 may receive a request (e.g., directly from the orchestrator server 1220 or from the CPU 1272 via the orchestrator server 1220) to adjust the threshold amount of the underutilized resource to be allocated to the corresponding logic portion (e.g., the logic portion 1252), to free up the unused amount of the resource for use by other logic portions (e.g., the logic portion 1254) of the accelerator 1250. In response, the accelerator 1250, in the illustrative embodiment, adjusts the threshold amount in accordance with the request, while the workloads are still being executed by the logic portions 1252, 1254 of the accelerator 1250. As such, the accelerator 1250 more efficiently uses the available shared resources 1256, 1258, thereby saving costs that would otherwise be spent to add additional resources to the data center 1100 to provide a particular agreed-upon quality of service (e.g., throughput, latency, etc.) for a customer (e.g., in a service level agreement (SLA)).

Figure 13:
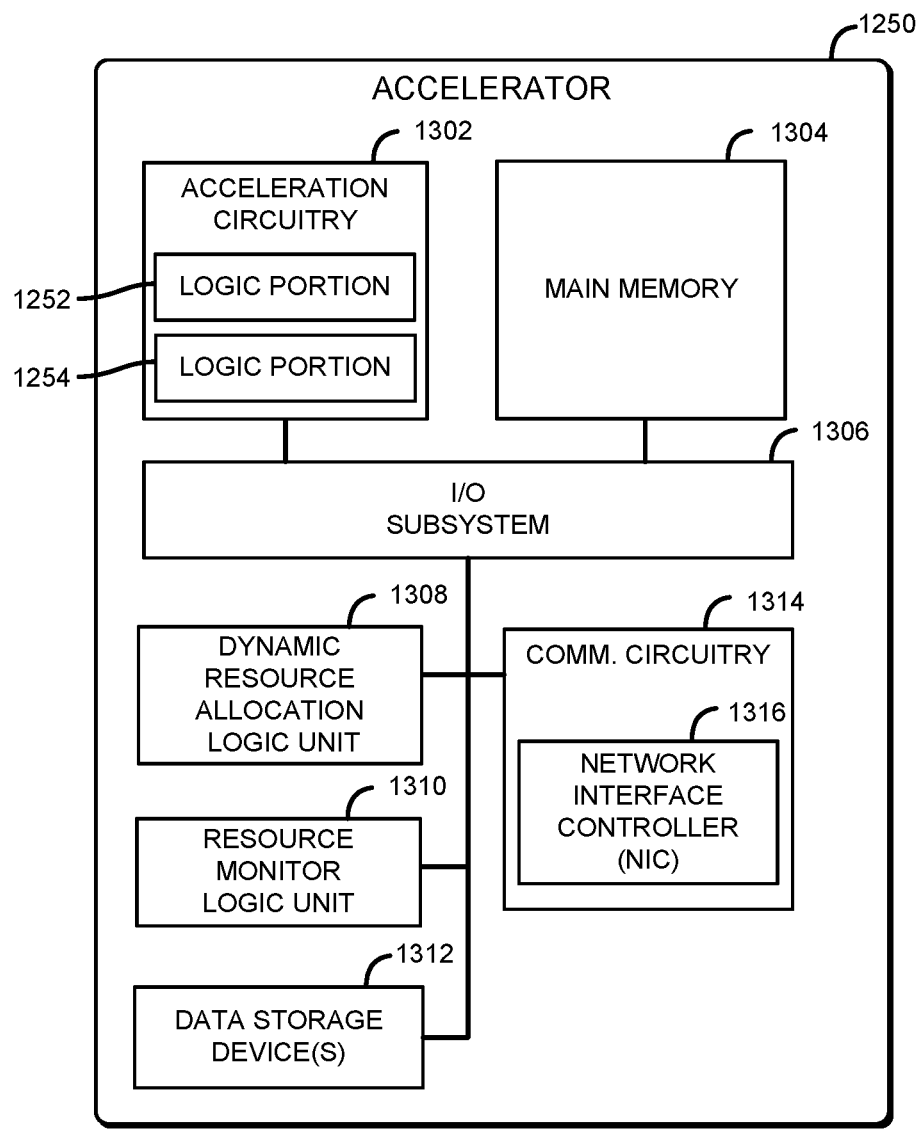
FIG. 13 is a simplified block diagram of at least one embodiment of an accelerator of the system of FIG. 12.

Referring now to FIG. 13, the accelerator 1250 may be embodied as any type of compute device capable of accelerating the execution of a workload and performing the other functions described herein, including continually allocating and reallocating shared resources to logic portions of the accelerator 1250 pursuant to requests from another compute device (e.g., the orchestrator server 1220, the CPU 1272, etc.) as the workloads are executed, monitoring the actual utilization of the shared resources by each logic portion, and reporting the resource utilization data to one or more other compute devices (e.g., the orchestrator server 1220, the CPU 1272, etc.). For example, the accelerator 1250 may be embodied as a physical accelerator resource 205-2 on a sled 204-2, as described above with reference to FIG. 2. As shown in FIG. 13, the accelerator 1250 includes acceleration circuitry 1302, a main memory 1304, an input/output (I/O) subsystem 1306, a dynamic resource allocation logic unit 1308, a resource monitor logic unit 1310, one or more data storage devices 1312, and communication circuitry 1314. In some embodiments, one or more of the illustrative components may be incorporated in, or otherwise form a portion of, another component. For example, the dynamic resource allocation logic unit 1308 and/or the resource monitor logic unit 1310 may be incorporated in the acceleration circuitry 1302.

The acceleration circuitry 1302 may be embodied as any circuitry capable of executing one or more workloads faster than a general purpose processor. The acceleration circuitry 1302 may be embodied as a field programmable gate array (FPGA), a cryptography accelerator, a graphics accelerator, a compression accelerator, or other specialized single or multi-core processor(s), an application specific integrated circuit (ASIC), reconfigurable hardware or hardware circuitry, or other specialized hardware to facilitate the accelerated execution of a workload. In the illustrative embodiment, the acceleration circuitry 1302 includes multiple logic portions 1252, 1254 which may be embodied as any devices or circuitry capable of concurrently executing separate workloads while accessing other resources of the accelerator 1250, such as the main memory 1304, the data storage devices 1312, and/or bandwidth of the communication circuitry 1314.

The main memory 1304 may be embodied as any type of volatile (e.g., dynamic random access memory (DRAM), etc.) or non-volatile memory or data storage capable of performing the functions described herein. In operation, the main memory 1304 may store various software and data used during operation such as workload data, resource utilization data, resource utilization threshold data, libraries, and drivers.

The I/O subsystem 1306 may be embodied as circuitry and/or components to facilitate input/output operations with the acceleration circuitry 1302, the main memory 1304, and other components of the accelerator 1250. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the acceleration circuitry 1302, the main memory 1304, and other components of the accelerator 1250, on a single integrated circuit chip.

The dynamic resource allocation logic unit 1308 may be embodied as any device or circuitry capable of allocating specified amounts of resources (e.g., main memory 1304, capacity of the data storage devices 1312, bandwidth of the communication circuitry 1314, etc.) to corresponding particular logic portions 1252, 1254. For example, the dynamic resource allocation logic unit 1308 may be embodied as a co-processor, embedded circuit, ASIC, FPGA, and/or other circuitry. The dynamic resource allocation logic unit 1308 may compare a request from one of the logic portions 1252 for an amount of a resource, compare the requested amount, and any amount already used by the requesting logic portion 1252, 1254, to a threshold amount to be allocated, and grant or deny the request as a function of whether the total amount (e.g., the amount already used and the requested amount) exceeds the threshold amount. Additionally, the dynamic resource allocation logic unit 1308 is to dynamically adjust the thresholds in response to requests (e.g., from another compute device) as the workloads are being executed by the logic portions 1252, 1254.

The resource monitor logic unit 1310 may be embodied as any device or circuitry capable of monitoring the resource utilization by each logic portion 1252, 1254 as the workloads are executed. For example, the dynamic resource allocation logic unit 1308 may be embodied as a co-processor, embedded circuit, ASIC, FPGA, and/or other circuitry. In the illustrative embodiment, the resource monitor logic unit 1310 may compare the resource utilization by a particular logic portion 1252, 1254 to the resource utilization threshold set by the dynamic resource allocation logic unit 1308 and determine whether the present resource utilization satisfies (e.g., is within a predefined range, such as 5%, of) the resource utilization threshold. If not, the resource monitor logic unit 1310, in the illustrative embodiment, may generate a violation message to report the present resource utilization to another compute device (e.g., the orchestrator server 1220, the CPU 1272, etc.). In other embodiments, the resource monitor logic unit 1310 may continually (e.g., on a periodic basis) report all resource utilizations by the logic portions 1252, 1254 regardless of whether the utilizations satisfy corresponding resource utilization thresholds.

The one or more illustrative data storage devices 1312, may be embodied as any type of devices configured for short-term or long-term storage of data such as, for example, memory devices and circuits, memory cards, hard disk drives, solid-state drives, or other data storage devices. Each data storage device 1312 may include a system partition that stores data and firmware code for the data storage device 1312. Each data storage device 1312 may also include an operating system partition that stores data files and executables for an operating system.

The communication circuitry 1314 may be embodied as any communication circuit, device, or collection thereof, capable of enabling communications over the network 1212 between the accelerator 1250 and another compute device (e.g., the orchestrator server 1220 and/or other compute devices). The communication circuitry 1314 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1314 includes a network interface controller (NIC) 1316, which may also be referred to as a host fabric interface (HFI). The NIC 1316 may be embodied as one or more add-in-boards, daughtercards, network interface cards, controller chips, chipsets, or other devices that may be used by the accelerator 1250 to connect with another compute device (e.g., the orchestrator server 1220). In some embodiments, the NIC 1316 may be embodied as part of a system-on-a-chip (SoC) that includes one or more processors, or included on a multichip package that also contains one or more processors. In some embodiments, the NIC 1316 may include a local processor (not shown) and/or a local memory (not shown) that are both local to the NIC 1316. In such embodiments, the local processor of the NIC 1316 may be capable of performing one or more of the functions of the acceleration circuitry 1302, the dynamic resource allocation logic unit 1308, and/or the resource monitor logic unit 1310 described herein. Additionally or alternatively, in such embodiments, the local memory of the NIC 1316 may be integrated into one or more components of the accelerator 1250 at the board level, socket level, chip level, and/or other levels. The accelerator 1260 may have components similar to those described in FIG. 13. The description of those components of the accelerator 1250 is equally applicable to the description of components of the accelerator 1260 and is not repeated herein for clarity of the description. While shown as being within one accelerator 130, in some embodiments, an accelerator sled (e.g., the accelerator sled 1240) may have one NIC 1316 that is shared by all of the accelerators 1250, 1260 on the accelerator sled 1240 and virtualized to appear as multiple NICs 1316 (e.g., one for each accelerator 1250, 1260).

Figure 14:
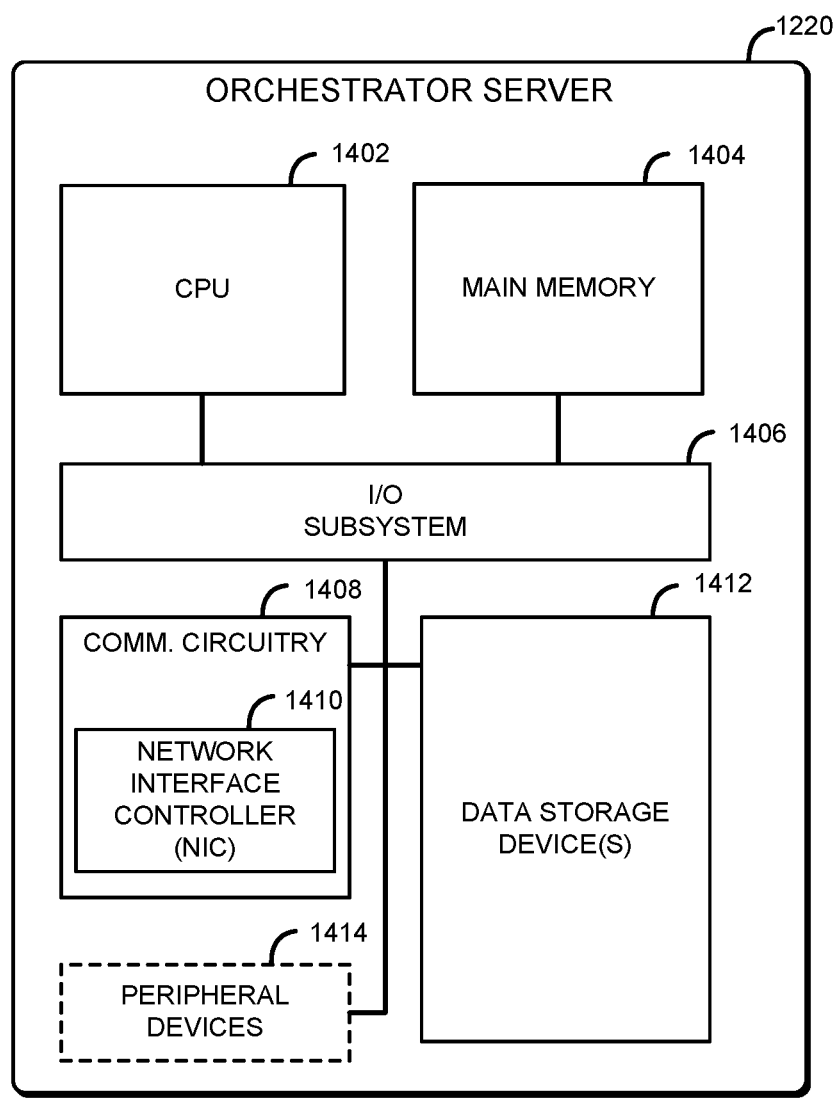
FIG. 14 is a simplified block diagram of at least one embodiment of an orchestrator server of the system of FIG. 12.

Referring now to FIG. 14, the orchestrator server 1220 may be embodied as any type of compute device capable of performing the functions described herein, including issuing a request to have cloud services performed, receiving results of the cloud services, assigning workloads to managed nodes 1230, managing communications between components (e.g., accelerators 1250, 1260, and CPUs 1272, 1282) of a managed node 1230, such as resource utilization violation messages and requests to change resource utilization thresholds for shared resources (e.g., the main memory 1304, the data storage devices 1312, the communication circuitry 1314, etc.) within an accelerator (e.g., the accelerator 1250). For example, the orchestrator server 1220 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 14, the illustrative orchestrator server 1220 includes a central processing unit (CPU) 1402, a main memory 1404, an input/output (I/O) subsystem 1406, communication circuitry 1408, and one or more data storage devices 1412. Of course, in other embodiments, the orchestrator server 1220 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1404, or portions thereof, may be incorporated in the CPU 1402.

The CPU 1402 may be embodied as any type of processor capable of performing the functions described herein. The CPU 1402 may be embodied as a single or multi-core processor(s), a microcontroller, or other processor or processing/controlling circuit. In some embodiments, the CPU

1402 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 1404 may be embodied as any type of volatile (e.g., dynamic random access memory (DRAM), etc.) or non-volatile memory or data storage capable of performing the functions described herein. In some embodiments, all or a portion of the main memory 1404 may be integrated into the CPU 1402. In operation, the main memory 1404 may store various software and data used during operation such as workload data, resource utilization data, resource utilization threshold data, quality of service data, operating systems, applications, programs, libraries, and drivers.

The I/O subsystem 1406 may be embodied as circuitry and/or components to facilitate input/output operations with the CPU 1402, the main memory 1404, and other components of the orchestrator server 1220. For example, the I/O subsystem 1406 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1406 may form a portion of a system-on-a-chip (SoC) and be incorporated, along with one or more of the CPU 1402, the main memory 1404, and other components of the orchestrator server 1220, on a single integrated circuit chip.

The communication circuitry 1408 may be embodied as any communication circuit, device, or collection thereof, capable of enabling communications over the network 1212 between the orchestrator server 1220 and another compute device (e.g., the client device 1214, and/or the managed nodes 1230). The communication circuitry 1408 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1408 includes a network interface controller (NIC) 1410, which may also be referred to as a host fabric interface (HFI). The NIC 1410 may be embodied as one or more add-in-boards, daughtercards, network interface cards, controller chips, chipsets, or other devices that may be used by the orchestrator server 1220 to connect with another compute device (e.g., the client device 1214 and/or the managed nodes 1230). In some embodiments, the NIC 1410 may be embodied as part of a system-on-a-chip (SoC) that includes one or more processors, or included on a multichip package that also contains one or more processors. In some embodiments, the NIC 1410 may include a local processor (not shown) and/or a local memory (not shown) that are both local to the NIC 1410. In such embodiments, the local processor of the NIC 1410 may be capable of performing one or more of the functions of the CPU 1402 described herein. Additionally or alternatively, in such embodiments, the local memory of the NIC 1410 may be integrated into one or more components of the orchestrator server 1220 at the board level, socket level, chip level, and/or other levels.

The one or more illustrative data storage devices 1412, may be embodied as any type of devices configured for short-term or long-term storage of data such as, for example, memory devices and circuits, memory cards, hard disk drives, solid-state drives, or other data storage devices. Each data storage device 1412 may include a system partition that stores data and firmware code for the data storage device 1412. Each data storage device 1412 may also include an operating system partition that stores data files and executables for an operating system.

Additionally or alternatively, the orchestrator server 1220 may include one or more peripheral devices 1414. Such peripheral devices 1414 may include any type of peripheral device commonly found in a compute device such as a display, speakers, a mouse, a keyboard, and/or other input/output devices, interface devices, and/or other peripheral devices.

The client device 1214 and the managed nodes 1230 may have components similar to those described in FIG. 14. The description of those components of the orchestrator server 1220 is equally applicable to the description of components of the client device 1214 and the managed nodes 1230 and is not repeated herein for clarity of the description. Further, it should be appreciated that any of the client device 1214 and the managed nodes 1230 may include other components, sub-components, and devices commonly found in a computing device, which are not discussed above in reference to the orchestrator server 1220 and not discussed herein for clarity of the description. As discussed above, each managed node 1230 may include resources distributed across multiple sleds and in such embodiments, the CPU 1402, memory 1404, and/or communication circuitry 1408 may include portions thereof located on the same sled or different sled.

As described above, the client device 1214, the orchestrator server 1220, and the managed nodes 1230 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 15:
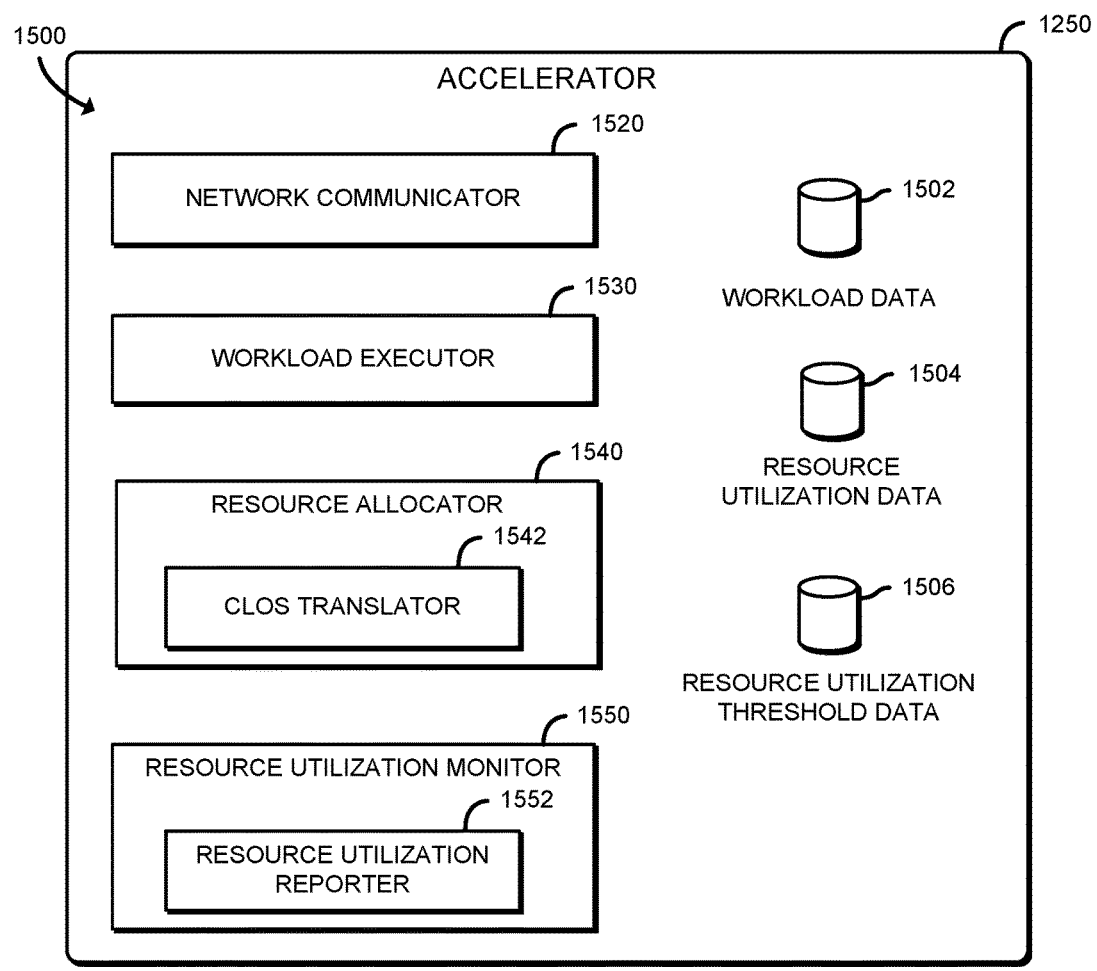
FIG. 15 is a simplified block diagram of at least one embodiment of an environment that may be established by an accelerator of FIGS. 12 and 13.

Referring now to FIG. 15, in the illustrative embodiment, each accelerator (e.g., the accelerator 1250) may establish an environment 1500 during operation. The illustrative environment 1500 includes a network communicator 1520, a workload executor 1530, a resource allocator 1540, and a resource utilization monitor 1550. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, workload executor circuitry 1530, resource allocator circuitry 1540, resource utilization monitor circuitry 1550, etc.). It should be appreciated that, in such embodiments, one or more of the network communicator circuitry 1520, workload executor circuitry 1530, resource allocator circuitry 1540, or resource utilization monitor circuitry 1550 may form a portion of one or more of the acceleration circuitry 1302, the dynamic resource allocation logic unit 1308, the resource monitor logic unit 1310, the main memory 1304, the I/O subsystem 1306, and/or other components of the accelerator 1250.

In the illustrative embodiment, the environment 1500 includes workload data 1502 which may be embodied as any data indicative of workloads to be executed by the logic portions 1252, 1254 of the accelerator 1250, such as bit streams usable to configure hardware of the logic portions

1252, 1254 to execute operations in a workload, computer-executable instructions, identifiers of the workloads, and/or a map of the assignments of workloads to the logic portions 1252, 1254. The illustrative environment 1500 additionally includes resource utilization data 1504 which may be embodied as any data indicative of the present utilization of each of the resources shared among the logic portions 1252, 1254 of the accelerator 1250, such as a number of gigabytes of the main memory 1304 used by each logic portion 1252, 1254, a number of gigabytes of the data storage devices 1312 used by each logic portion 1252, 1254, a number of gigabytes per second of network bandwidth used by each logic portion 1252, 1254, etc. or relative values, such as percentages of the resources used by each logic portion 1252, 1254. Additionally, the illustrative environment 1500 includes resource utilization threshold data 1506 which may be embodied as any data indicative of limits on the amount of one or more types of resources (e.g., main memory 1304, data storage 1312, communication circuitry 1314, etc.) that are to be used by each logic portion 1252, 1254. As described herein, the accelerator 1250 may continually adjust the resource utilization threshold data 1506 as the workloads are executed (e.g., in response to requests received from another compute device such as the orchestrator server 1220). In some embodiments, the resource utilization threshold data 1506 may include identifiers of classes of service and corresponding resource types and amounts of each resource type to be allocated in association with the identified class of service.

In the illustrative environment 1500, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the accelerator 1250, respectively. To do so, the network communicator 1520 is configured to receive and process data packets from one system or computing device (e.g., the orchestrator server 1220) and to prepare and send data packets to a system or computing device (e.g., the orchestrator server 1220). Accordingly, in some embodiments, at least a portion of the functionality of the network communicator 1520 may be performed by the communication circuitry 1408, and, in the illustrative embodiment, by the NIC 1410. The workload executor 1530, which may be embodied as hardware, firmware, software, virtualized hardware, emulated architecture, and/or a combination thereof as discussed above, is configured to execute workloads assigned to the accelerator 1250 using the logic portions 1252, 1254.

The resource allocator 1540, which may be embodied as hardware, firmware, software, virtualized hardware, emulated architecture, and/or a combination thereof as discussed above, is configured to allocate specified amounts of resources (e.g., main memory 1304, capacity of the data storage devices 1312, bandwidth of the communication circuitry 1314, etc.) to the corresponding particular logic portions 1252, 1254. The resource allocator 1540 may do so by comparing a request from one of the logic portions 1252 for an amount of a resource, comparing the requested amount, and any amount already used by the requesting logic portion 1252 to a threshold amount to be allocated (e.g., an amount identified in the resource utilization threshold data 1506), and granting or denying the request as a function of whether the total amount (e.g., the amount already used and the requested amount) exceeds the threshold amount. Additionally, the resource allocator 1540 is to dynamically adjust the thresholds in the resource utilization threshold data 1506 in response to requests (e.g., from another compute device such as the orchestrator server 1220) as the workloads are being executed by the logic portions 1252, 1254. In the illustrative embodiment, the resource allocator 1540 includes a class of service translator 1542, which may be configured to translate a given class of service to an amount of a particular resource to be allocated, such as by referencing a map of classes of service and corresponding types and amounts of resources defined in the resource utilization threshold data 1506 as described above. It should be appreciated that the class of service translator 1542 may be embodied as hardware, firmware, software, virtualized hardware, emulated architecture, and/or a combination thereof.

The resource utilization monitor 1550, which may be embodied as hardware, firmware, software, virtualized hardware, emulated architecture, and/or a combination thereof as discussed above, is configured to monitor the utilization of each logic portion 1252, 1254 as the workloads are executed. In the illustrative embodiment, the resource utilization monitor 1550 may compare the utilization of a particular logic portion 1252, 1254 to a corresponding resource utilization threshold in the resource utilization threshold data 1506 and determine whether the present resource utilization satisfies the threshold. For example, the resource utilization monitor 1550 may determine whether the present utilization of a resource by the logic portion 1252 is within a predefined range, such as 5%, of the corresponding resource utilization threshold. In the illustrative embodiment, the resource utilization monitor 1550 includes a resource utilization reporter 1552, which may be configured to report the resource utilization data 1504 to another compute device (e.g., to the orchestrator server 1220). In some embodiments, the resource utilization reporter 1552 may be configured to report only resource utilizations that do not satisfy their corresponding resource utilization thresholds. In other embodiments, the resource utilization reporter 1552 may be configured to report all resource utilization data 1504, such as on a periodic, repeating basis or in response to a query from another compute device (e.g., from the orchestrator server 1220). It should be appreciated that the resource utilization reporter 1552 may be embodied as hardware, firmware, software, virtualized hardware, emulated architecture, and/or a combination thereof.

Figure 16:
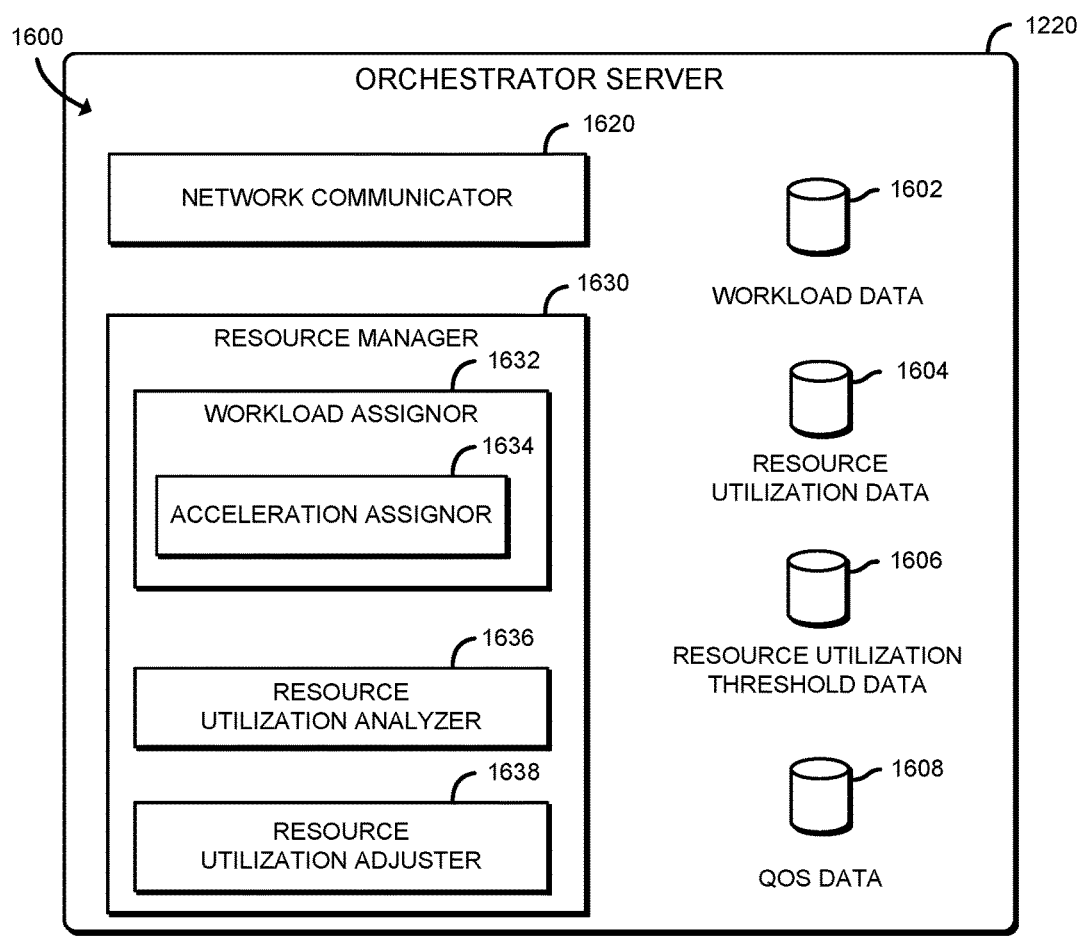
FIG. 16 is a simplified block diagram of at least one embodiment of an environment that may be established by the orchestrator server of FIGS. 12 and 14.

Referring now to FIG. 16, the orchestrator server 1220 may establish an environment 1600 during operation. The illustrative environment 1600 includes a network communicator 1620 and a resource manager 1630. Each of the components of the environment 1600 may be embodied as hardware, firmware, software, or a combination thereof. As such, in some embodiments, one or more of the components of the environment 1600 may be embodied as circuitry or a collection of electrical devices (e.g., network communicator circuitry 1620, resource manager circuitry 1630, etc.). It should be appreciated that, in such embodiments, one or more of the network communicator circuitry 1620 or resource manager circuitry 1630 may form a portion of one or more of the CPU 1402, the main memory 1404, the I/O subsystem 1406, and/or other components of the orchestrator server 1220. In the illustrative embodiment, the environment 1600 includes workload data 1602 which may be embodied as any data indicative of workloads to be executed by the managed nodes 1230 and the assignments of the workloads to the components of the managed nodes 1230, such as identifications of accelerators 1250, 1260, to which workloads are assigned, the logic portions 1252, 1254, 1262, 1264 within the accelerators 1250, 1260 that are executing the workloads, identifications of CPUs 1272, 1282 executing workloads, and/or other data indicative of the present assignment of the workloads among the managed nodes 1230. Additionally, the illustrative environment 1600 includes resource utilization data 1604, which is similar to the resource utilization data 1504 except the resource utilization data 1604 includes data indicative of resource utilizations across all components of all of the managed nodes 1230, rather than only the utilizations of resources within the accelerator 1250. Further, in the illustrative embodiment, the environment 1600 includes resource utilization threshold data 1606 which is similar to the resource utilization threshold data 1506, except the resource utilization threshold data 1606 includes data indicative of resource utilization thresholds across the managed nodes 1230, rather than only the resource utilization thresholds specific to the accelerator 1250. In addition, in the illustrative embodiment, the environment 1600 includes quality of service data 1608 which may be indicative of quality of service targets (e.g., a maximum latency, a minimum throughput, etc.) to be provided in association with different workloads (e.g., based on service level agreements with customers) and quality of service measurements (e.g., latency, throughput, etc.) presently provided by the system 1210 as the workloads are executed.

In the illustrative environment 1600, the network communicator 1620, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1220, respectively. To do so, the network communicator 1620 is configured to receive and process data packets from one system or computing device (e.g., the client device 1214) and to prepare and send data packets to another computing device or system (e.g., the managed nodes 1230). Accordingly, in some embodiments, at least a portion of the functionality of the network communicator 1620 may be performed by the communication circuitry 1408, and, in the illustrative embodiment, by the NIC 1410.

The resource manager 1630, which may be embodied as hardware, firmware, software, virtualized hardware, emulated architecture, and/or a combination thereof, is configured to assign workloads to the managed nodes 1230 including the accelerators (e.g., accelerators 1250, 1260) and general purpose CPUs (e.g., CPUs 1272, 1282), receive the resource utilization data 1604 and send requests to components of the managed nodes 1230 (e.g., the accelerators 1250, 1260) to adjust the resource utilization thresholds on a continual basis in response to changes in resource utilizations indicated in the resource utilization data 1604. To do so, in the illustrative embodiment, the resource manager 1630 includes a workload assignor 1632, a resource utilization analyzer 1636, and a resource utilization adjuster 1638. The workload assignor 1632, in the illustrative embodiment, is configured to assign workloads to the managed nodes 1230 for execution. Further, in the illustrative embodiment, the workload assignor 1632 includes an acceleration assignor 1634 which is configured to assign certain workloads or portions thereof to corresponding accelerators (e.g., the accelerators 1250, 1260). In doing so, the acceleration assignor 1634 may identify a type of the workload based on a profile of resource utilizations of the workload over time or based on a tag, an analysis of the computer-executable instructions within the workload, a header of the workload, metadata indicative of the types operations to be executed in the workload, or from a request from a CPU (e.g., the CPU 1272) to offload a portion of a workload onto a particular accelerator 1250, 1260 or type of accelerator (e.g., FPGA, graphics accelerator, cryptography accelerator, compression accelerator, etc.), and assign the workload to a corresponding accelerator 1250, 1260 for execution.

The resource utilization analyzer, in the illustrative embodiment, is configured to receive the resource utilization data 1604 and determine whether the present utilization of resources among the managed nodes 1230, such as the utilization by logic portions (e.g., the logic portions 1252, 1254) of shared resources within an accelerator (e.g., the accelerator 1250) is in violation of resource utilization threshold indicated in the resource utilization threshold data 1606. As described above, in some embodiments, the accelerators 1250, 1260 may only report violations of the resource utilization thresholds rather than all resource utilizations. The resource utilization adjuster 1638, in the illustrative embodiment, is configured to determine an adjustment to be made to the utilization of a resource, such as an adjustment to a resource utilization threshold for a particular resource (e.g., the memory 1304) for a particular logic portion (e.g., the logic portion 1252) of an accelerator (e.g., the accelerator 1250). The resource utilization adjuster 1638 may determine a change in the class of service to be assigned, such as reducing from a second class of service associated with using 50% of the resource (e.g., the memory 1304) to a first class of service associated with using 40% of the resource, thereby freeing up a portion of that resource for use by another logic portion (e.g., the logic portion 1254) of the accelerator (e.g., the accelerator 1250). In some embodiments, a CPU (e.g., the CPU 1272) on a compute sled (e.g., the compute sled 1270) of a managed node 1230 executing a workload, such as an application, may perform all or a subset of the functions described above, to manage the acceleration of a portion of the workload executed by the CPU 1272 and, as such, may establish an environment similar to the environment 1600.

It should be appreciated that each of the workload assignor 1632, the acceleration assignor 1634, the resource utilization analyzer 1636, and the resource utilization adjuster 1638 may be separately embodied as hardware, firmware, software, virtualized hardware, emulated architecture, and/or a combination thereof. For example, the workload assignor 1632 may be embodied as a hardware component, while the acceleration assignor 1634, the resource utilization analyzer 1636, and the resource utilization adjuster 1638 are embodied as virtualized hardware components or as some other combination of hardware, firmware, software, virtualized hardware, emulated architecture, and/or a combination thereof.

Figure 17:
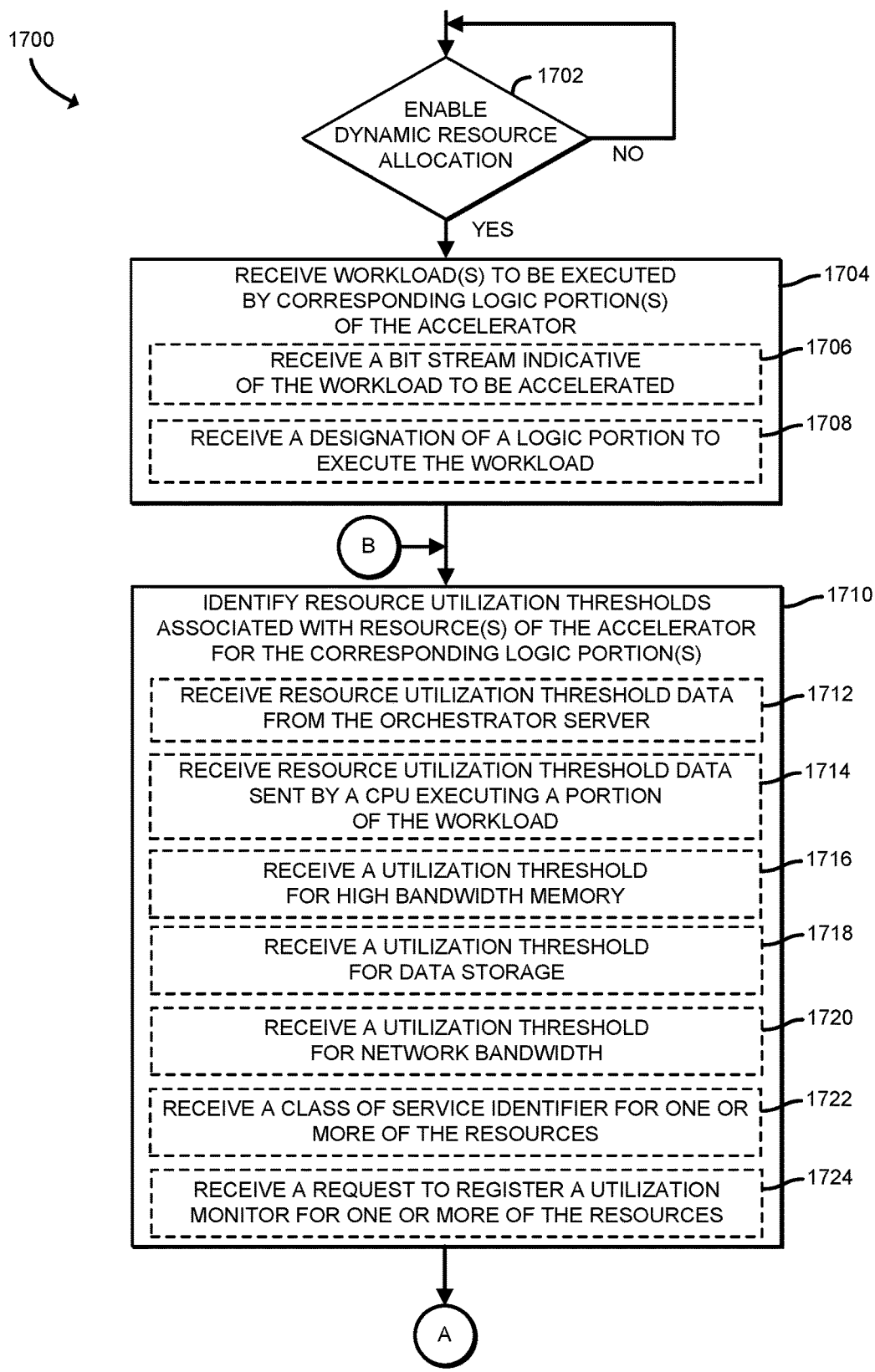
FIGS. 17-18 are a simplified flow diagram of at least one embodiment of a method for performing dynamic resource allocation among logic portions that may be performed by an accelerator of FIGS. 12 and 13.

Referring now to FIG. 17, in use, an accelerator (e.g., the accelerator 1250) may execute a method 1700 for performing dynamic resource allocation among its logic portions (e.g., the logic portions 1252, 1254). The method 1700 begins with block 1702 in which the accelerator 1250 determines whether to enable dynamic resource allocation. In the illustrative embodiment, the accelerator 1250 determines to enable dynamic resource allocation if the accelerator 1250 determines that it is capable of executing multiple workloads concurrently in different logic portions 1252, 1254, such as by detecting the presence of the logic portions 1252, 1254 or by comparing an identifier of the accelerator 1250 to a set of accelerator identifiers known to be capable of executing workloads in separate logic portions. In other embodiments, the accelerator 1250 may make the determination of whether to enable dynamic resource allocation based on other factors. Regardless, in response to a determination to enable dynamic resource allocation, the method 1700 advances to block 1704 in which the accelerator 1250 receives one or more workloads to be executed by corresponding logic portions 1252, 1254 of the accelerator 1250. In doing so, the accelerator 1250 may receive a bit stream indicative of the workload to be accelerated, as indicated in block 1706. The bit stream may include configuration data for configuring the logic gates of the accelerator 1250 if the accelerator 1250 is a FPGA. In receiving the one or more workloads, the accelerator 1250 may receive a designation of a logic portion 1252, 1254 of the accelerator 1250 that is to execute the workload, as indicated in block 1708. The designation may be an identifier, such as a number, that uniquely identifies the logic portion 1252, 1254 within the accelerator 1250.

Subsequently, in block 1710, the accelerator 1250 identifies one or more resource utilization thresholds (e.g., the resource utilization threshold data 1506) associated with the resources of the accelerator 1250 for the corresponding one or more logic portions 1252, 1254 that are to execute the assigned one or more workloads from block 1704. In doing so, the accelerator 1250 may receive the resource utilization threshold data 1506 from the orchestrator server 1220, as indicated in block 1712. As indicated in block 1714, the accelerator 1250 may receive the resource utilization threshold data 1506 from a CPU (e.g., the CPU 1272) executing a portion of the workload, such as a portion that is not to be accelerated, as indicated in block 1714. In some embodiments, the orchestrator server 1220 may initially receive the resource utilization threshold data 1506 from the CPU 1272 and then forward the resource utilization threshold data 1506 to the accelerator 1250. As indicated in block 1716, the accelerator 1250 may receive a utilization threshold for high bandwidth memory (e.g., the main memory 1304), such as number of gigabytes of the main memory 1304 that are to be used by the logic portion 1252, or a percentage of the total amount of main memory 1304 that is to be used by the logic portion 1252. Similarly, as indicated in block 1718, the accelerator 1250 may receive a utilization threshold for data storage (e.g., the data storage devices 1312), such as a number of gigabytes of the capacity of the data storage devices 1312 or a percentage of a total amount of the available capacity. Additionally or alternatively, as indicated in block 1720, the accelerator 1250 may receive a utilization threshold for network bandwidth, such as a number of gigabytes per second or a percentage of the total amount of capacity of the communication circuitry 1314 of the accelerator 1250. As indicated in block 1722, the accelerator 1250 may receive a class of service identifier for one or more of the resources, which the accelerator 1250 may then translate to a corresponding numeric value (e.g., gigabytes, gigabytes per second, etc.) or percentage of total capacity, such as with the map of classes of service and corresponding values in the resource utilization threshold data 1506, as described with reference to FIG. 15. Additionally, as indicated in block 1724, the accelerator 1250 may receive a request to register a utilization monitor for one or more of the resources to be shared among the logic portions 1252, 1254. The request may identify the logic portion 1252, 1254 to which the monitor pertains, the type of resource whose utilization is to be monitored by the accelerator 1250, and the corresponding utilization threshold for the resource. As such, if the utilization threshold is not satisfied (e.g., the actual resource utilization is not within a predefined range, such as 5% of the threshold), the accelerator 1250 may report the violation of the resource utilization threshold to the orchestrator server 1220 or the CPU 1272. Subsequently, the method 1700 advances to block 1726 of FIG. 18, in which the accelerator 1250 executes the assigned one or more workloads with the corresponding one or more logic portions 1252, 1254 of the accelerator 1250.

Figure 18:
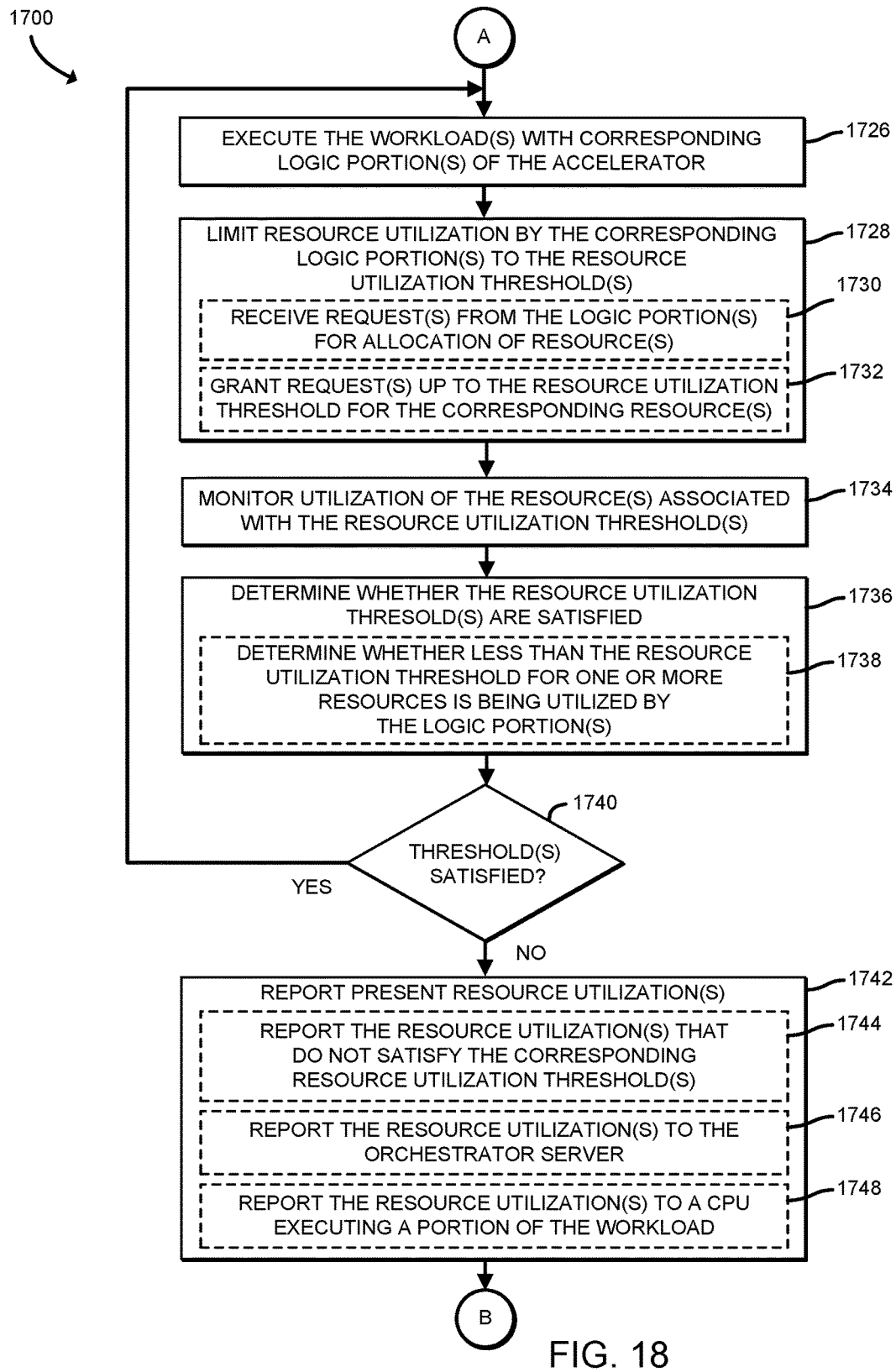

Referring now to FIG. 18, in block 1728, the accelerator 1250 limits the resource utilization by the corresponding logic portions 1252, 1254 to the resource utilization thresholds from block 1710. In doing so, the accelerator 1250, and in particular, the dynamic resource allocation logic unit 1308, may receive a request from the logic portions 1252, 1254 for allocation of resources, such as a request for a particular amount of memory capacity or network bandwidth. As indicated in block 1732, the accelerator 1250, and in particular, the dynamic resource allocation logic unit 1308, may grant requests up to the corresponding resource utilization thresholds for the requesting logic portions 1252, 1254 and deny requests that would result in resource utilizations that exceed the corresponding resource utilization thresholds. Additionally, in block 1734, the accelerator 1250 monitors the utilization of the resources that are associated with the resource utilization thresholds identified in block 1710 of FIG. 17. In doing so, the resource monitor logic unit 1310 may add together the requested amounts of resources from the requests received by the dynamic resource allocation logic unit 1308 to determine the total amount of each resource used by each logic portion 1252, 1254, and/or may receive telemetry data from the resources (e.g., through the I/O subsystem 1306) which may be embodied as any data indicative of the present utilization (e.g., portion of the capacity presently being used) of the resource and the logic portions 1252, 1254 or workloads associated with those utilizations. In the illustrative embodiment, in block 1736, the accelerator 1250 determines whether the resource utilization thresholds are satisfied. In doing so, as indicated in block 1738, the accelerator 1250 determines whether less than the resource utilization threshold for each resource is being used by the corresponding logic portion. In the illustrative embodiment, the accelerator 1250 may determine that the threshold is satisfied as long as the present utilization is within a predefined range, such as 5%, of the corresponding threshold (e.g., a threshold of 50% of the memory capacity may be satisfied if the present utilization is between 45% and 50% of the memory capacity). In block 1740, the accelerator 1250 determines the subsequent operations to perform in response to whether the resource utilization thresholds are presently satisfied. If the thresholds are satisfied, the method 1700 loops back to block 1726 in which the accelerator 1250 continues to execute the workloads with the corresponding logic portions 1252, 1254. Otherwise, if one or more of the resource utilization thresholds are not satisfied, the method 1700 advances to block 1742.

In block 1742, the accelerator 1250 reports one or more of the present resource utilizations to another compute device in the system 1210. In doing so, as indicated in block 1744, the accelerator 1250 reports the resource utilizations that do not satisfy the corresponding resource utilization thresholds. As indicated in block 1746, the accelerator 1250 may report the resource utilizations to the orchestrator server 1220. In other embodiments, the accelerator 1250 may report the resource utilizations to a CPU executing a portion of the workload (e.g., the CPU 1272 executing a portion of the workload that is not to be accelerated). In some embodiments, the orchestrator server 1220 may receive the resource utilizations, as described in block 1746, and forward the resource utilizations on to the CPU (e.g., the CPU 1272) for analysis. Subsequently, the method 1700 loops back to block 1710 of FIG. 17, in which the accelerator 1250 again identifies resource utilization thresholds, such as by receiving adjusted resource utilization thresholds for the reported resource utilizations that did not satisfy the earlier resource utilization thresholds. As such, with lower resource utilization thresholds, an unused portion of those resources that were previously reserved for use by one of the logic portions (e.g., the logic portion 1252) may become available for use by another logic portion (e.g., the logic portion 1254) in the accelerator 1250.

Figure 19:
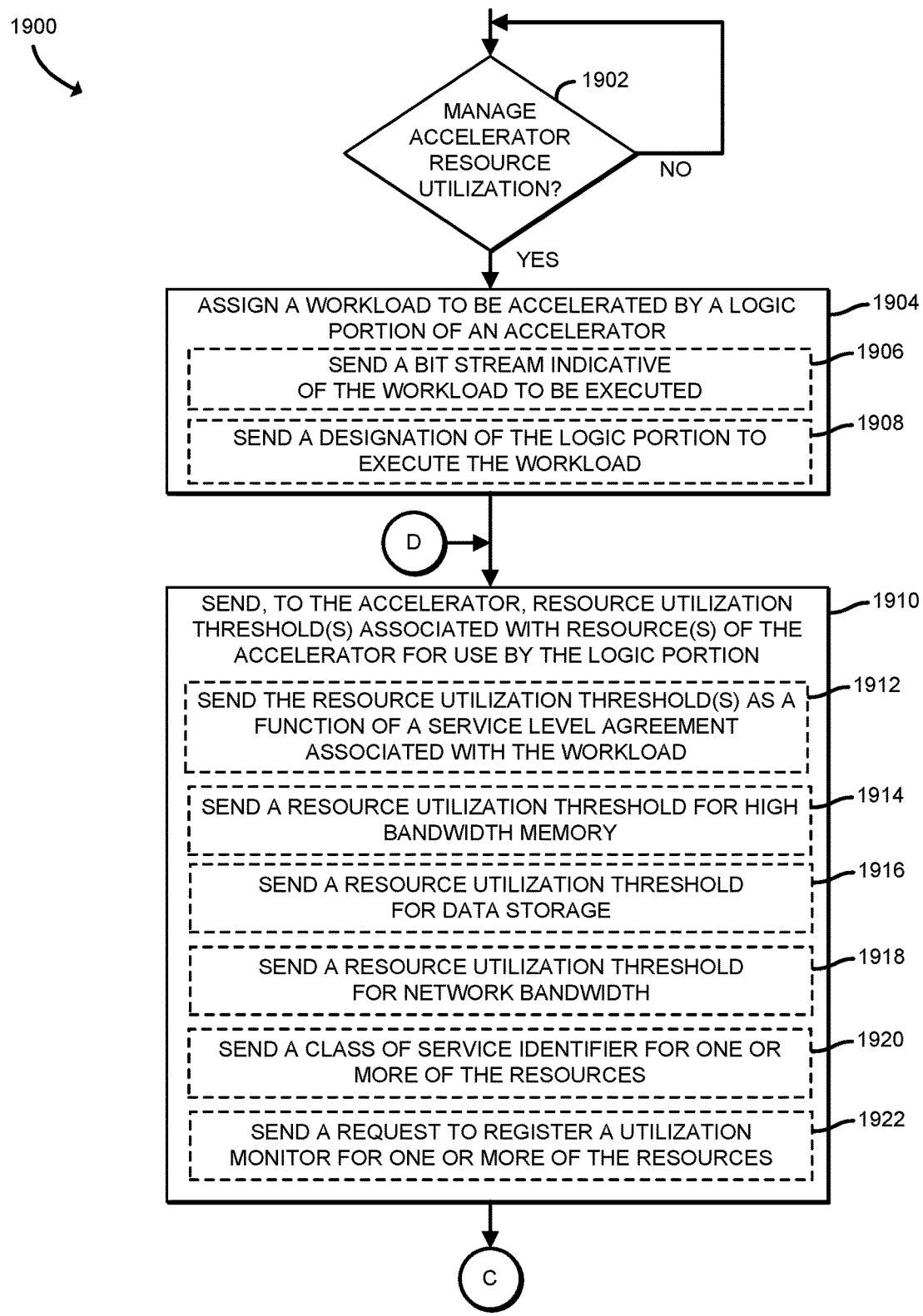
FIGS. 19-20 are a simplified flow diagram of at least one embodiment of a method for managing resource utilization within an accelerator that may be performed by the orchestrator server of FIGS. 12 and 14.

Referring now to FIG. 19, in use, the orchestrator server 1220 may execute a method 1900 for managing resource utilizations within an accelerator (e.g., the accelerator 1250). It should be understood that while the method 1900 is described with respect to one accelerator (e.g., the accelerator 1250), the orchestrator server 1220 may perform the method 1900 for other accelerators (e.g., the accelerator 1260) in the system 1210 as well. The method 1900 begins with block 1902 in which the orchestrator server 1220 determines whether to manage resource utilizations of an accelerator (e.g., the accelerator 1250) in the system 1210. In the illustrative embodiment, the orchestrator server 1220 may determine to manage accelerator resource utilizations if at least one accelerator having the ability to execute workloads on separate logic portions 1252, 1254 is present in the system 1210. In other embodiments, the orchestrator server 1220 may make the determination of whether to manager accelerator resource utilizations based on other factors. Regardless, in response to a determination to manage acceleration resource utilizations, the method 1900 advances to block 1904, in which the orchestrator server 1220 assigns a workload to be accelerated by a logic portions (e.g., the logic portion 1252) of an accelerator (e.g., the accelerator 1250). As described above, with reference to FIG. 16, the orchestrator server 1220 may make the determination to assign a workload in response to identifying the workload or a portion of the workload as being amenable to a particular type of acceleration for which an accelerator (e.g., the accelerator 1250) is available. As indicated in block 1906, in assigning the workload, the orchestrator server 1220 may send, to an accelerator (e.g., the accelerator 1250) a bit stream indicative of the workload to be executed. The bit stream may include configuration data usable to configure logic gates of an FPGA to execute the workload. In block 1908, in assigning the workload, the orchestrator server 1220 may send a designation of the logic portion (e.g., the logic portion 1252) that is to execute the assigned workload. The designation may be an identifier, such as a number, that uniquely identifies the logic portion 1252 in the accelerator 1250.

Subsequently, in block 1910, the orchestrator server 1220 sends one or more resource utilization thresholds associated with one or more resources of the accelerator 1250 for the logic portion 1252 that is to execute the workload. In doing so, the orchestrator server 1220 may send the one or more resource utilization thresholds as a function of a service level agreement associated with the workload. As described above, with reference to FIG. 16, the quality of service data 1608 may include quality of service targets (e.g., a maximum latency, a minimum throughput, etc.) that are to be met in the execution of workloads on behalf of various customers. As such, orchestrator server 1220 may send corresponding resource utilization thresholds to control the allocation of resources in the accelerator 1250 to enable the logic portion 1252 of the accelerator 1250 to satisfy the quality of service targets while executing the workload. In block 1914, the orchestrator server 1220 may send a resource utilization threshold for high bandwidth memory (e.g., the main memory 1304). Block 1914 corresponds with block 1716 of FIG. 17 described above. As indicated in block 1916, the orchestrator server 1220 may send a resource utilization threshold for data storage (e.g., the data storage devices 1312). Block 1916 corresponds with block 1718, described above with reference to FIG. 17. Additionally or alternatively, in block 1918, the orchestrator server 1220 may send a resource utilization threshold for network bandwidth (e.g., the communication circuitry 1314). Block 1918 corresponds with block 1720 of FIG. 17, described above. In block 1920, the orchestrator server 1220 may send a class of service identifier for one or more of the resources. As described above with reference to block 1722, each class of service may be mapped to a corresponding actual amount of a resource to be allocated to the logic portion 1252. In the illustrative embodiment, the orchestrator server 1220 may send a request to the accelerator 1250 to register a utilization monitor for one or more of the resources (e.g., a resource having a utilization threshold associated with it). Block 1922 corresponds with block 1724 of FIG. 17, described above.

Figure 20:
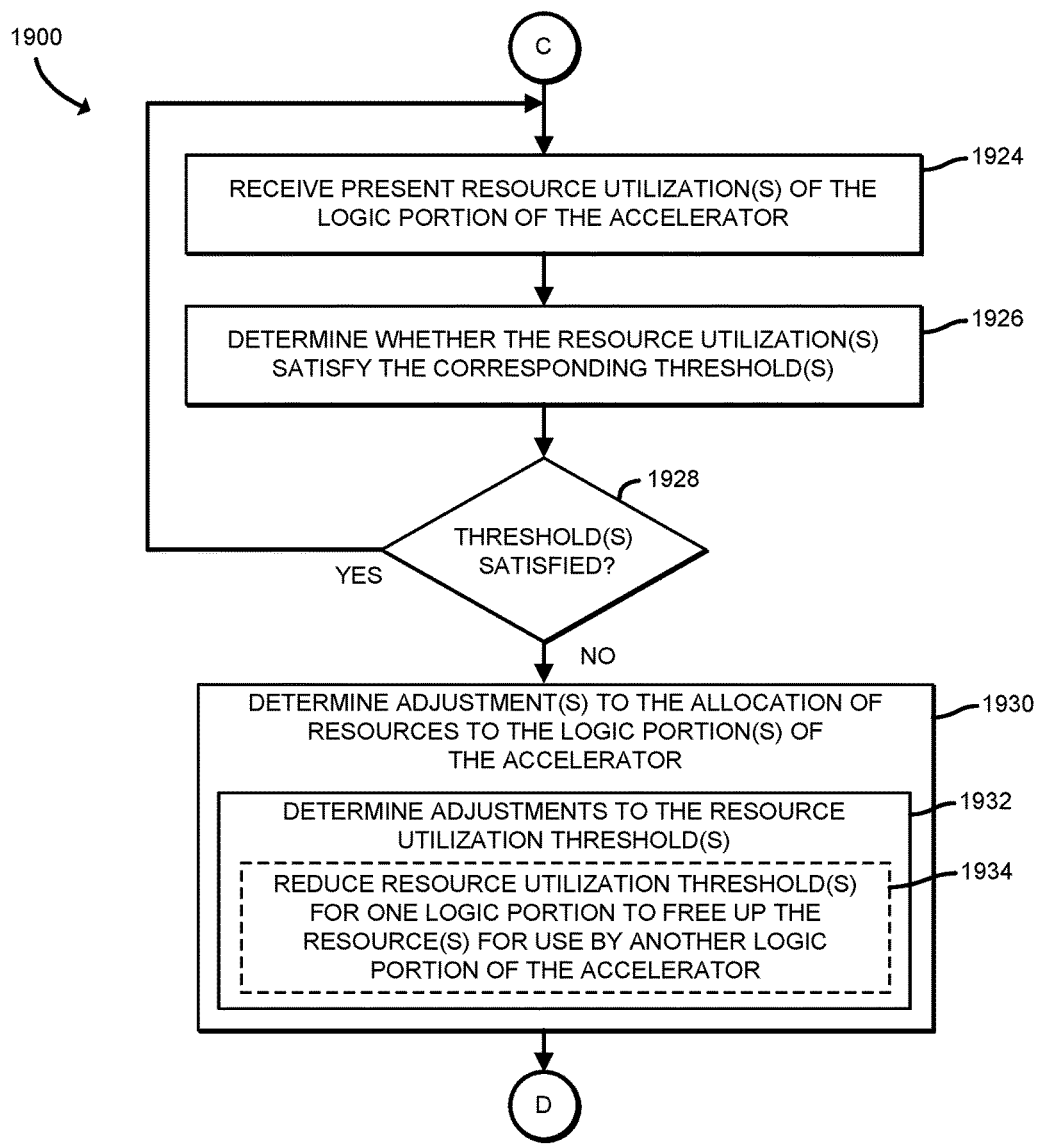

Subsequently, the method 1900 advances to block 1924 of FIG. 20, in which the orchestrator server 1220 receives present resource utilization data (e.g., the resource utilization data 1604) of the logic portion 1252 executing the workload. Subsequently, the orchestrator server 1220 determines whether the one or more resource utilizations indicated in the received resource utilization data satisfy the corresponding thresholds. To make the determination, the orchestrator server 1220 may perform an analysis similar to that described with reference to block 1736 of FIG. 18. For example, the orchestrator server 1220 may determine whether a given resource utilization reported by the accelerator 1250 is within a predefined range, such as 5%, of the corresponding resource utilization threshold. In other embodiments, the mere fact that the orchestrator server 1220 received resource utilization data 1604 for a particular resource and logic portion (e.g., the logic portion 1252) is indicative of a violation of the corresponding threshold, such as when the accelerator 1250 sends the resource utilization data in association with a resource utilization monitor that was registered in block 1922 of FIG. 19. In some embodiments, the orchestrator server 1220 may receive notifications (e.g., resource utilization data 1604) through an out-of-band management network on a particular channel and port that was configured at boot time. In block 1928, the orchestrator server 1220 determines the subsequent operations as a function of whether the resource utilization threshold(s) are satisfied. In response to a determination that the resource utilization thresholds are satisfied, the method 1900 loops back to block 1924 in which the orchestrator server 1220 continues to await resource utilization data 1604. Otherwise, if one or more of the thresholds are not satisfied, the method 1900 advances to block 1930 in which the orchestrator server 1220 determines one or more adjustments to the allocation of resources to the logic portion 1252 of the accelerator 1250. In doing so, as indicated in block 1932, the orchestrator server 1220 determines one or more adjustments to one or more of the resource utilization thresholds. In the illustrative embodiment, the orchestrator server 1220 reduces the violated resource utilization threshold(s) for one logic portion (e.g., the logic portion 1252, which did not use all of a resource capacity allocated to it) to free up the resource(s) for use by another logic portion (e.g., the logic portion 1254) of the accelerator 1250. Subsequently, the method 1900 loops back to block 1910 of FIG.

19, in which the orchestrator server 1220 sends the updated resource utilization threshold(s) to the accelerator 1250. While described as being performed by the orchestrator server 1220, in some embodiments, a CPU (e.g., the CPU 1272) executing a workload associated with the workload assigned to the accelerator 1250 may perform all or a portion of method 1900 (e.g., with the accelerator 1250 sending resource utilization data 1504 either directly to the CPU 1272 or through the orchestrator server 1220 to the CPU 1272).

Figure 21:
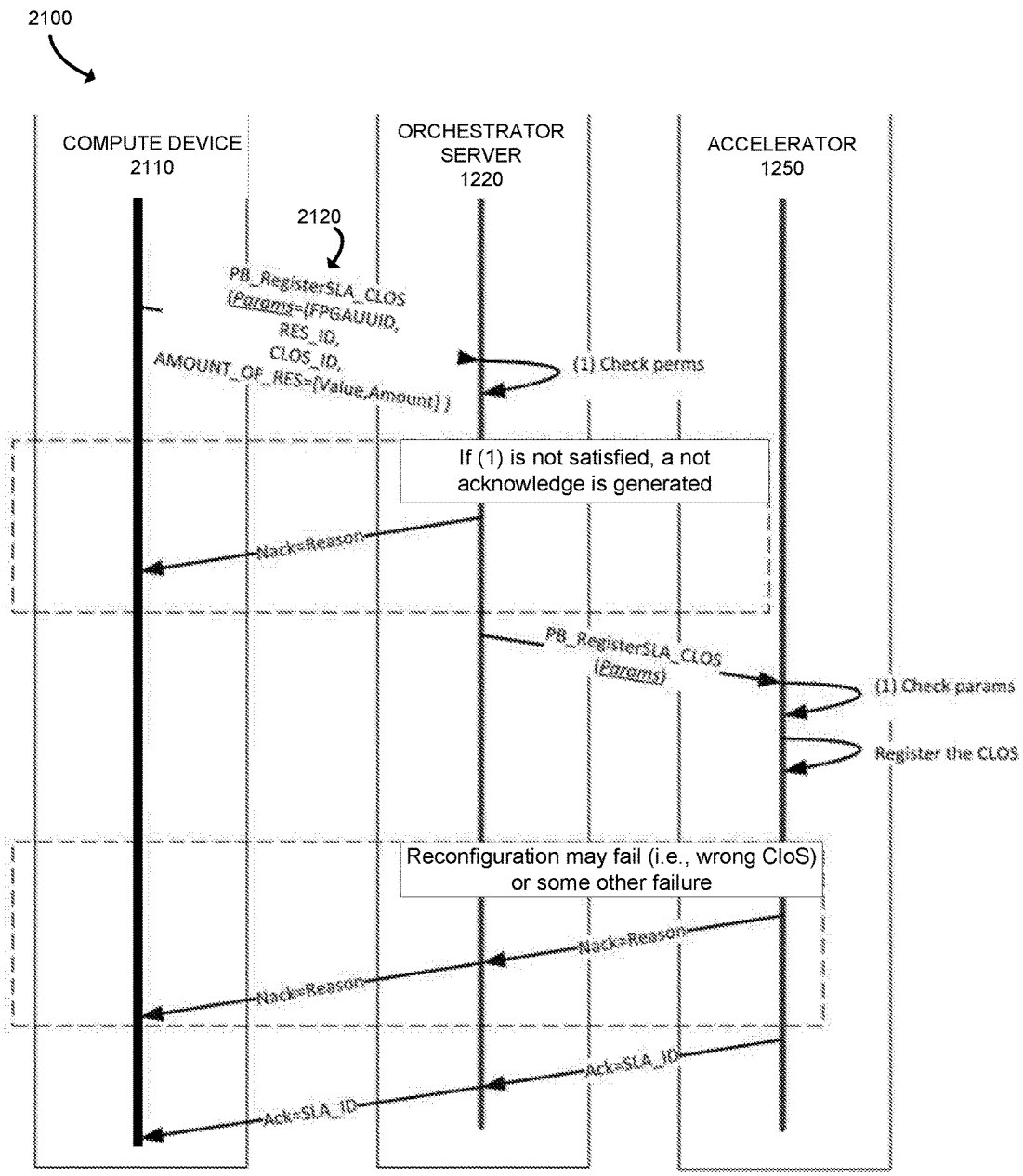
FIG. 21 is a simplified flow diagram of at least one embodiment of network communications to register a class of service with a type of resource and an amount of the type of resource to be allocated in association with the class of service.

Referring now to FIG. 21, in a series 2100 of messages, a compute device 2210, which may be an administrator's compute device, sends a message 2120 to the orchestrator server 1220 to register a class of service pursuant to a service level agreement. The message 2120, in the illustrative embodiment, includes an identifier of an accelerator (e.g., the accelerator 1250), an identifier of a resource, such as a number or other identifier capable of uniquely identifying a shared resource within the accelerator 1250 (e.g., the main memory 1304, the data storage devices 1312, the communication circuitry 1314, etc.), an identifier of the class of service (e.g., "1", "2", etc.), and an amount of the resource to be allocated in association with that class of service. The amount may be specified as a combination of an indication of the type of the measurement (e.g., a relative measurement or an absolute measurement) and the corresponding amount (e.g., 50%, or 2 gigabytes). In response, the orchestrator server 1220 determines whether the compute device 2110 has permission to register the class of service, such as by comparing an identifier of the compute device or login credentials entered by a user of the compute device 2110 to a reference set of permissions data. In response to a determination that the compute device 2110 does not have permission to register the class of service, the orchestrator server 1220 sends a not acknowledge ("NACK") message back to the compute device 2110. Otherwise, the orchestrator server 1220 sends the registration message 2120 including the parameters, to the identified accelerator (e.g., the accelerator 1250). In response, the accelerator 1250 determines whether the parameters are acceptable (e.g., whether the specified amount of the resource is actually available to be allocated if the corresponding class of service is requested, whether the class of service is a duplicate of another class of service that has already been registered, etc.). In response to a determination that the parameters are not acceptable, the accelerator sends a NACK message back to the orchestrator server 1220, which in turn, sends the NACK message to the compute device 2110. Otherwise, the accelerator 1250 registers the class of service (e.g., in the resource utilization threshold data 1506) and sends an acknowledgement message ("ACK") back to the orchestrator server 1220. In the illustrative embodiment, the acknowledgement message includes an identifier of a service level agreement associated with the registered class of service. The orchestrator server 1220, in the illustrative embodiment, then sends the acknowledgement message to the compute device 2210.

Figure 22:
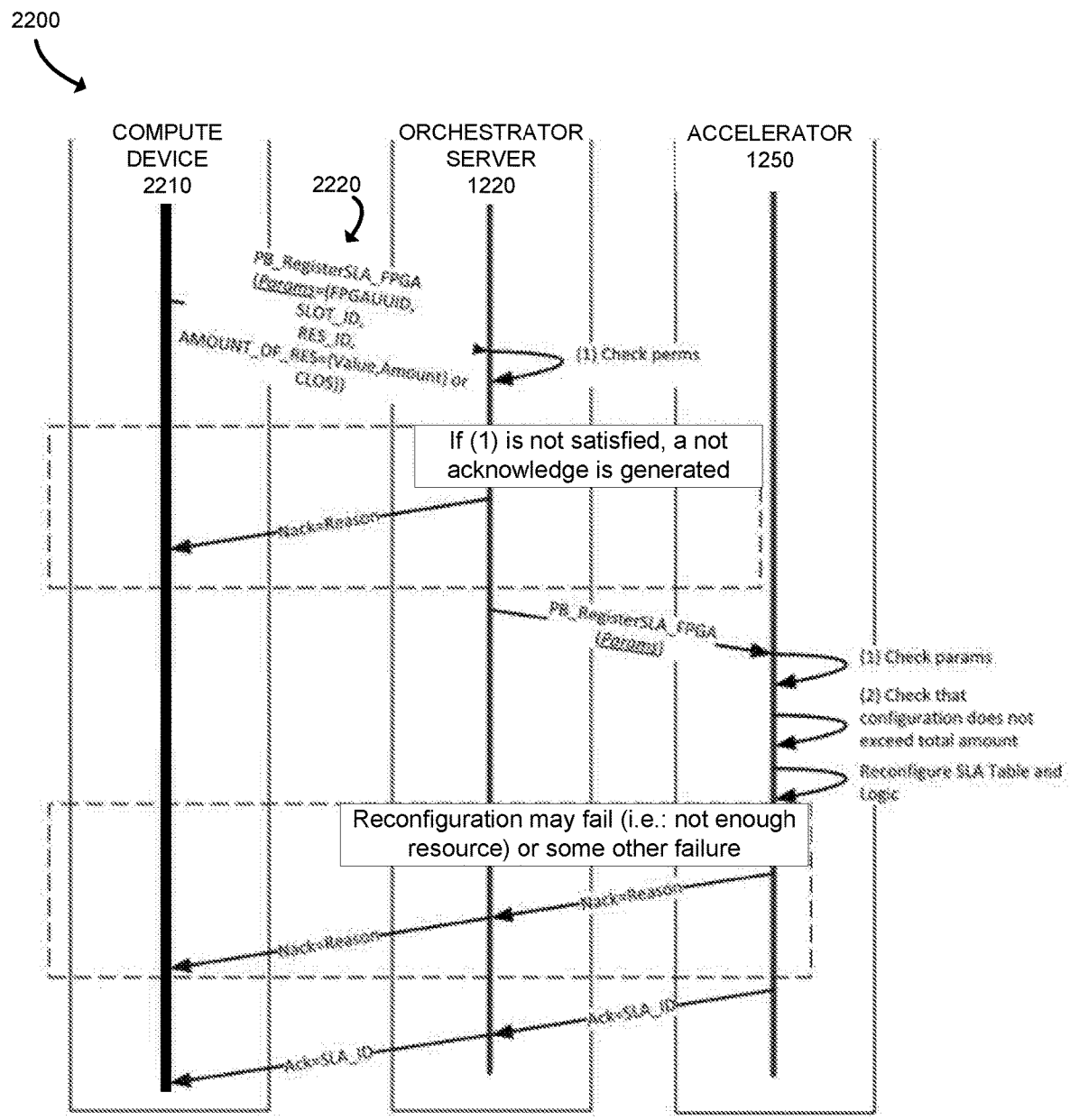
FIG. 22 is a simplified flow diagram of at least one embodiment of network communications to allocate a specified amount of a particular resource to a logic portion of the accelerator of FIGS. 12-13.

Referring now to FIG. 22, in a series 2200 of messages, a compute device 2210, which may be a CPU (e.g., CPU 1272) on a compute sled (e.g., the compute sled 1270) executing a workload associated with a workload to be executed on an accelerator (e.g., the accelerator 1250) sends a message 2220 to the orchestrator server 1220 to set a resource utilization threshold for a particular logic portion (e.g., the logic portion 1252) and a particular resource (e.g., the main memory 1304, the data storage devices 1308, the communication circuitry 1314). The message 2220 includes a set of parameters, including an identifier of the accelerator (e.g., the accelerator 1250), an identifier of the logic portion (e.g., the logic portion 1252) in the accelerator 1250, an identifier of the resource for which the threshold pertains, and an actual value of the threshold or a reference to the class of service (e.g., a class of service registered in the series 2100 of messages described with reference to FIG. 21). The orchestrator server 1220 subsequently determines whether the compute device 2210 has permission to set the resource utilization threshold (e.g., whether the compute device 2210 is included in the same managed node 1230 as the accelerator 1250 and is executing a workload associated with the workload to be accelerated by the accelerator 1250). In response to a determination that the compute device 2210 does not have the requisite permissions, the orchestrator server 1220 sends a NACK message back to the compute device 2210. Otherwise, the orchestrator server 1220 forwards the message on to the identified accelerator (e.g., the accelerator 1250). In response, the accelerator 1250 checks the parameters, including determining whether the requested resource utilization threshold does not exceed the total capacity of the identified resource, and if the parameters are satisfactory, reconfigures the resource utilization threshold (e.g., by storing the new resource utilization threshold in the resource utilization threshold data 1506 for use by the dynamic resource allocation logic unit 1308 and the resource monitor logic unit 1310 of FIG. 13). The accelerator 1250 then sends an ACK message that includes an identifier of the service level agreement associated with the resource utilization threshold. Otherwise, the accelerator 1250 sends a NACK message that identifies an error in the parameters. In either case, the orchestrator server 1220 sends the response from the accelerator 1250 back to the compute device 2210.

Figure 23:
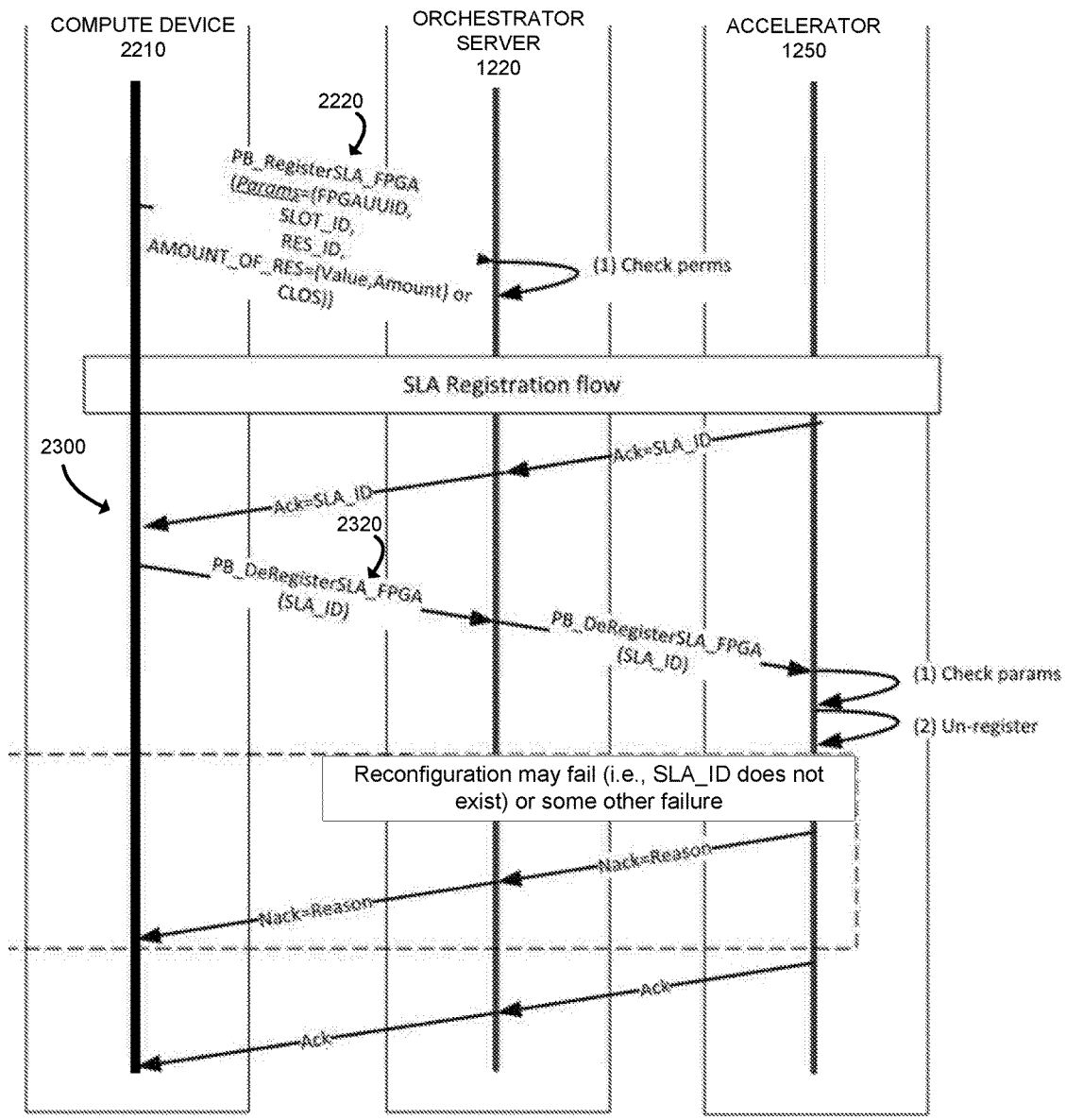
FIG. 23 is a simplified flow diagram of at least one embodiment of network communications to deallocate a previous allocation of a particular resource from a logic portion of the accelerator of FIGS. 12-13.

Referring now to FIG. 23, in a series 2300 of messages, the compute device 2210 may send a message 2320 to the orchestrator server 1220 to remove a resource utilization threshold that was previously set, such as in the series 2200 of messages described with reference to FIG. 22. In the illustrative embodiment, the message 2320 to remove the resource utilization threshold includes the identifier of the service level agreement that was previously sent from the accelerator 1250 to the compute device 2210 when the resource utilization threshold was set. In response, the orchestrator server 1220 sends the message 2320 to the accelerator 1250. Subsequently, the accelerator 1250, in the illustrative embodiment, determines whether the service level agreement identified in the message 2320 corresponds to a previously set resource utilization threshold. If not, the accelerator 1250 sends back a NACK message. Otherwise, the accelerator removes the resource utilization threshold (e.g., removes the resource utilization threshold from the resource utilization threshold data 1506) and sends an ACK message back to the orchestrator server 1220, which sends the ACK message to the compute device 2210.

Figure 24:
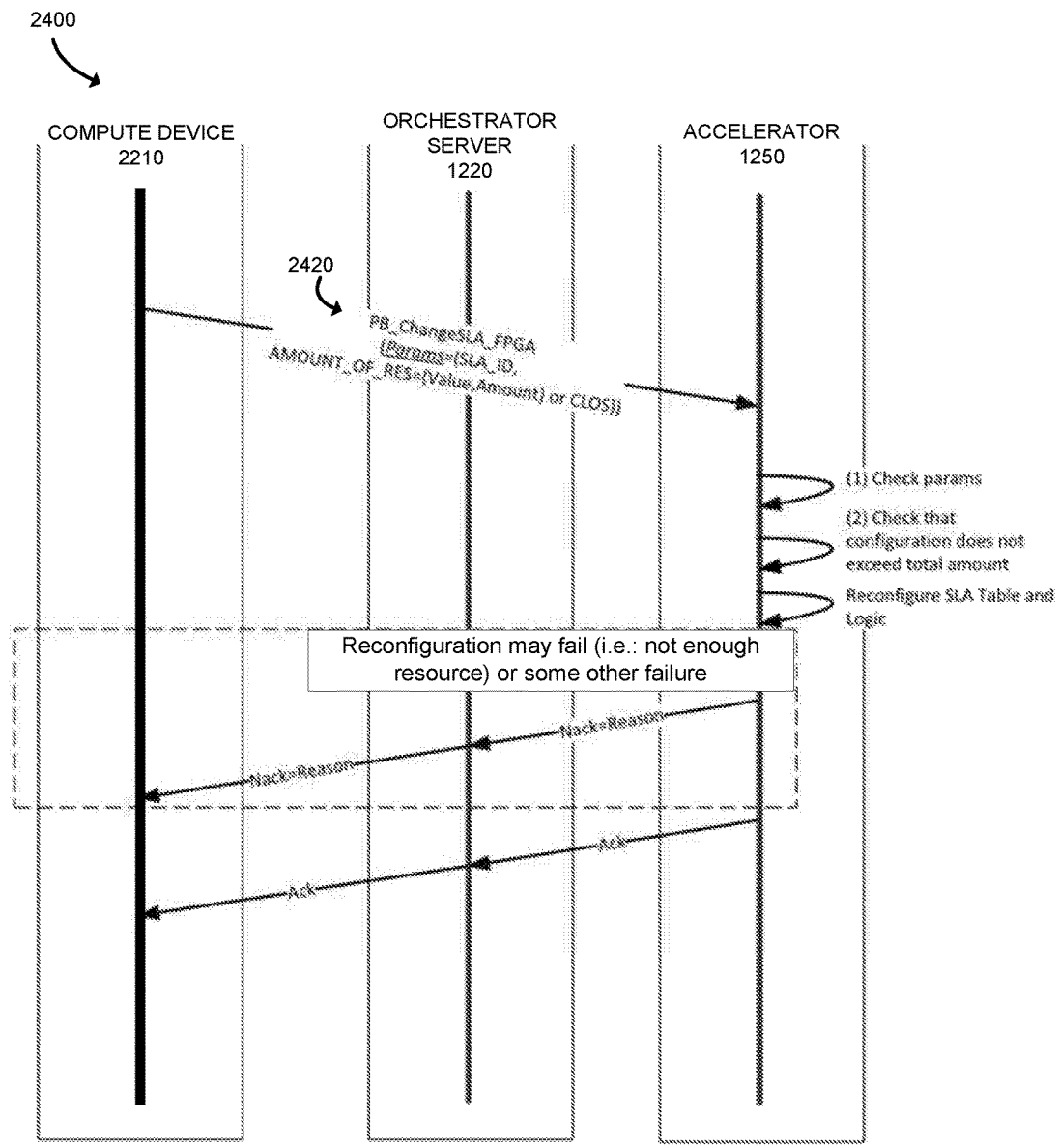
FIG. 24 is a simplified flow diagram of at least one embodiment of network communications to adjust an allocation of a particular resource to a logic portion of the accelerator of FIGS. 12-13.

Referring now to FIG. 24, in a series 2400 of messages, the compute device 2210 may send a message 2420 to the orchestrator server 1220 to adjust a resource utilization threshold that was previously set. The message 2420 includes the identifier of the service level agreement that was returned by the accelerator 1250 when the resource utilization threshold was originally set, and the adjusted threshold, which may be embodied as an absolute amount (e.g., gigabytes), a relative amount (e.g., 50%), or a class of service that has previously been registered (e.g., in the series 2100 of messages of FIG. 21). The orchestrator server 1220 receives the message 2420 and sends it to the accelerator 1250 which determines whether the adjusted resource utilization threshold is within the total amount of the resource available to the accelerator 1250, and if so, sets the adjusted resource utilization threshold, such as by storing it in the resource utilization threshold data 1506. Subsequently, the accelerator 1250 sends an ACK message to the orchestrator server 1220 which then sends the ACK message to the compute device 2210. However, if the adjusted resource utilization threshold exceeds the total amount of the resource available in the accelerator 1250, the accelerator 1250 instead sends back a NACK message to the orchestrator server 1220, which then sends the NACK message to the compute device 2210.

Figure 25:
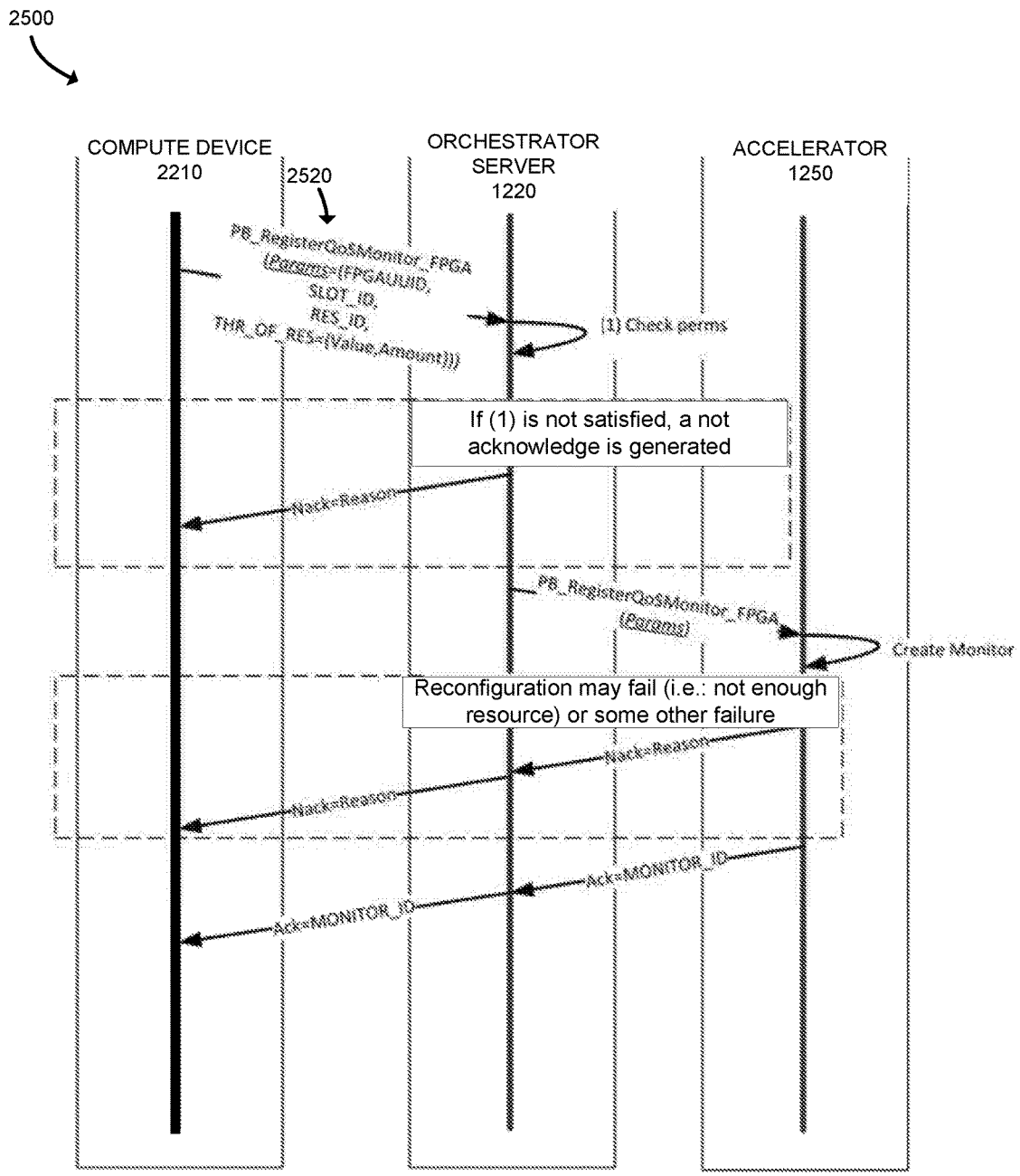
FIG. 25 is a simplified flow diagram of at least one embodiment of network communications to register a monitor for a specified type of resource utilization in the accelerator of FIGS. 12-13.

Referring now to FIG. 25, in a series 2500 of messages, the compute device 2210 may send a message 2520 to the orchestrator server 1220 to register a resource utilization monitor to generate a violation message if a resource utilization threshold is not satisfied during the execution of a workload by a logic portion (e.g., the logic portion 1252) of an accelerator (e.g., the accelerator 1250). The message includes an identifier of the accelerator 1250, an identifier of the logic portion 1252, an identifier of the resource whose utilization is to be monitored, and the resource utilization threshold that, if not satisfied, should result in the accelerator 1250 sending a violation message indicating that the resource utilization threshold has not been satisfied. In response, the orchestrator server 1220 determines whether the compute device 2210 has permission to register the resource utilization monitor, using a process similar to that described with reference to FIG. 21. If the orchestrator server 1220 determines that the compute device 2210 does not have permission to register the resource utilization monitor, the orchestrator server 1220 sends back a NACK message indicating that the compute device 2210 does not have permission to register a resource utilization monitor. Otherwise, the orchestrator server 1220 sends the message 2520 to the accelerator 1250. In response, the accelerator 1250 determines whether the threshold amount of the resource specified in the message 2520 is within the total amount of the resource available to the accelerator 1250 and, if so, creates a resource utilization monitor, such as by storing the threshold in the resource utilization threshold data 1506 and determining to report a violation if the resource monitor logic unit 1310 determines that the utilization of the specified resource by the specified logic portion 1252 does not satisfy the threshold defined in the message 2520. If the threshold amount in the message 2520 exceeds the total amount of the resource available, the accelerator 1250 instead sends back a NACK message. Otherwise, the accelerator 1250 sends back an ACK message indicating that the resource utilization monitor has been successfully registered. In the illustrative embodiment, the ACK message includes an identifier of the registered resource utilization monitor. The accelerator 1250 may store the identifier of the registered monitor in the resource utilization threshold data 1506 in association with the resource utilization threshold.

Figure 26:
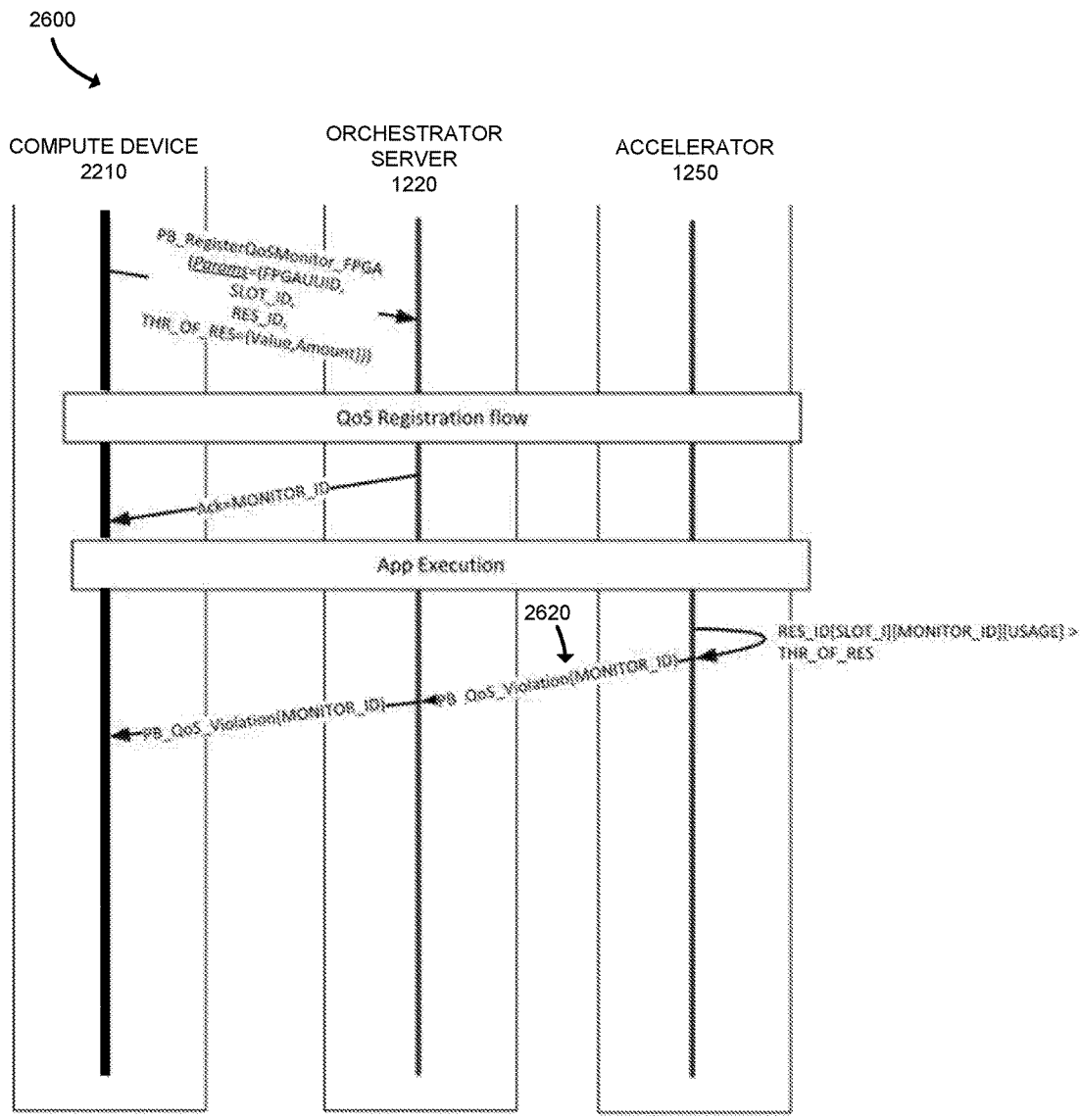
FIG. 26 is a simplified flow diagram of at least one embodiment of network communications to report a violation of a resource utilization threshold by a logic portion of the accelerator of FIGS. 12-13.

Referring now to FIG. 26, in a series 2600 of messages, during the execution of a workload, if the accelerator 1250 determines that a resource utilization monitor that was registered previously (e.g., the resource utilization monitor registered in the series 2500 of messages), the accelerator 1250 sends a violation message 2620 to the orchestrator server 1220. The violation message 2620, in the illustrative embodiment, includes the identifier of the registered resource utilization monitor corresponding to the violated resource utilization threshold. In some embodiments, the violation message 2620 may additionally include the present resource utilization of the corresponding resource by the corresponding logic portion 1252. The orchestrator server 1220, in response, sends the violation message 2620 to the compute device 2210.

Figure 27:
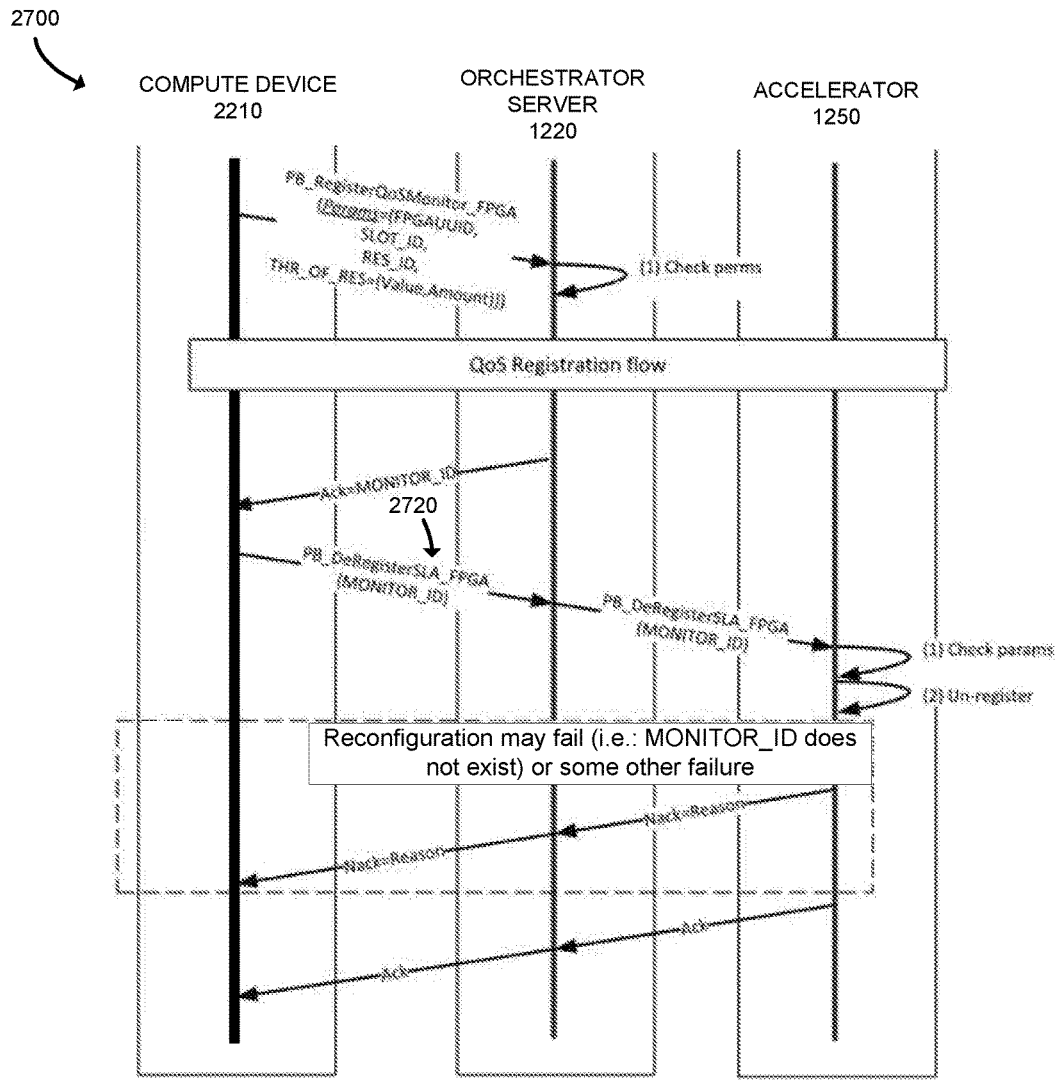
FIG. 27 is a simplified flow diagram of at least one embodiment of network communications to deregister the monitor registered in FIG. 25.

Referring now to FIG. 27, in a series 2700 of messages, the compute device 2210 may send a message 2720 to deregister a resource utilization monitor (e.g., the resource utilization monitor registered in the series of 2500 of messages). The message 2720 includes the identifier of the resource utilization monitor to be deregistered. The orchestrator server 1220, in the illustrative embodiment, receives the message 2720 and sends the message 2720 on to the accelerator 1250. In response, the accelerator 1250 determines whether the identifier corresponds with a registered resource utilization monitor, which may be stored in association with the corresponding resource utilization threshold in the resource utilization threshold data 1506. If so, the accelerator 1250 deregisters the resource utilization monitor, such as by removing the corresponding resource utilization threshold and monitor identifier from the resource utilization threshold data 1506, and sends back an ACK message. Otherwise, the accelerator 1250 sends back a NACK message indicating that the deregistration failed.

EXAMPLES

Illustrative examples of the technologies disclosed herein are provided below. An embodiment of the technologies may include any one or more, and any combination of, the examples described below.

Example 1 includes an accelerator to dynamically manage the utilization of shared resources within the accelerator, the accelerator comprising acceleration circuitry comprising multiple logic portions, wherein each logic portion is capable of executing a different workload; one or more shared resources to be used by the logic portions in the execution of the workloads; communication circuitry to receive a workload to be executed by a logic portion of the accelerator; and a dynamic resource allocation logic unit to (i) identify a resource utilization threshold associated with one or more of the shared resources of the accelerator to be used by a logic portion of the multiple logic portions in the execution of the workload, (ii) limit, as a function of the resource utilization threshold, the utilization of the one or more shared resources by the logic portion as the logic portion executes the workload, and (iii) adjust the resource utilization threshold as the workload is executed.

Example 2 includes the subject matter of Example 1, and further including a resource monitor logic unit to monitor the resource utilization by the logic portion as the workload is executed and report the resource utilization to another device.

Example 3 includes the subject matter of any of Examples 1 and 2, and wherein the resource monitor logic unit is further to determine whether the present resource utilization satisfies the resource utilization threshold associated with the corresponding resources and wherein to report the present resource utilization to another device comprises to report the present resource utilization in response to a determination that the present resource utilization does not satisfy the resource utilization threshold.

Example 4 includes the subject matter of any of Examples 1-3, and wherein to adjust the resource utilization threshold comprises to receive an adjustment to the resource utilization threshold from the other device; and apply the adjustment to the resource utilization threshold.

Example 5 includes the subject matter of any of Examples 1-4, and wherein to receive the workload comprises to receive a bit stream indicative of the workload to be accelerated.

Example 6 includes the subject matter of any of Examples 1-5, and wherein to receive the workload comprises to receive a designation of a logic portion to execute the workload.

Example 7 includes the subject matter of any of Examples 1-6, and wherein to identify the resource utilization threshold comprises to receive resource utilization threshold data indicative of the resource utilization threshold from an orchestrator server.

Example 8 includes the subject matter of any of Examples 1-7, and wherein to identify the resource utilization threshold comprises to receive resource utilization threshold data indicative of the resource utilization threshold from a processor assigned to execute a portion of the workload.

Example 9 includes the subject matter of any of Examples 1-8, and wherein to identify the resource utilization threshold comprises to receive a resource utilization threshold indicative of an amount of memory to be used by the logic portion.

Example 10 includes the subject matter of any of Examples 1-9, and wherein to identify the resource utilization threshold comprises to receive a resource utilization threshold indicative of an amount of data storage to be used by the logic portion.

Example 11 includes the subject matter of any of Examples 1-10, and wherein to identify the resource utilization threshold comprises to receive a resource utilization threshold indicative of an amount of network bandwidth to be used by the logic portion.

Example 12 includes the subject matter of any of Examples 1-11, and wherein to identify the resource utilization threshold comprises to receive an identifier of a class of service associated with an amount of a resource to be used by the logic portion.

Example 13 includes the subject matter of any of Examples 1-12, and wherein to identify the resource utilization threshold comprises to receive a request to register a resource utilization monitor to monitor a utilization of one or more of the resources by the logic portion.

Example 14 includes the subject matter of any of Examples 1-13, and wherein to limit the utilization of the one or more resources comprises to receive a request from the logic portion for allocation of an amount of a resource; determine whether the requested amount is less than or equal to the resource utilization threshold; and allocate, in response to a determination that the requested amount is less than or equal to the resource utilization threshold, the requested amount to the logic portion.

Example 15 includes the subject matter of any of Examples 1-14, and wherein the resource monitor logic unit is further to determine whether less than the resource utilization threshold is presently utilized by the logic portion; and determine, in response to a determination that that less than the resource utilization threshold is presently utilized by the logic portion, that the resource utilization threshold is not satisfied.

Example 16 includes a method for dynamically managing the utilization of shared resources within an accelerator, the method comprising receiving, by the accelerator, a workload to be executed by a logic portion of a plurality of logic portions of the accelerator; identifying, by the accelerator, a resource utilization threshold associated with one or more shared resources of the accelerator to be used by the logic portion in the execution of the workload; limiting, as a function of the resource utilization threshold, the utilization of the one or more shared resources by the logic portion as the logic portion executes the workload; and adjusting, subsequent to the limiting of the utilization, the resource utilization threshold as the workload is executed.

Example 17 includes the subject matter of Example 16, and further including monitoring, by the accelerator, the resource utilization by the logic portion as the workload is executed; and reporting, by the accelerator, the resource utilization to another device.

Example 18 includes the subject matter of any of Examples 16 and 17, and further including determining, by the accelerator, whether the present resource utilization satisfies the resource utilization threshold associated with the corresponding resources; wherein reporting the present resource utilization to another device comprises reporting the present resource utilization in response to a determination that the present resource utilization does not satisfy the resource utilization threshold.

Example 19 includes the subject matter of any of Examples 16-18, and wherein adjusting the resource utilization threshold comprises receiving, by the accelerator, an adjustment to the resource utilization threshold from the other device; and applying, by the accelerator, the adjustment to the resource utilization threshold.

Example 20 includes the subject matter of any of Examples 16-19, and wherein receiving the workload comprises receiving a bit stream indicative of the workload to be accelerated.

Example 21 includes the subject matter of any of Examples 16-20, and wherein receiving the workload comprises receiving a designation of a logic portion to execute the workload.

Example 22 includes the subject matter of any of Examples 16-21, and wherein identifying the resource utilization threshold comprises receiving resource utilization threshold data indicative of the resource utilization threshold from an orchestrator server.

Example 23 includes the subject matter of any of Examples 16-22, and wherein identifying the resource utilization threshold comprises receiving resource utilization threshold data indicative of the resource utilization threshold from a processor assigned to execute a portion of the workload.

Example 24 includes the subject matter of any of Examples 16-23, and wherein identifying the resource utilization threshold comprises receiving a resource utilization threshold indicative of an amount of memory to be used by the logic portion.

Example 25 includes the subject matter of any of Examples 16-24, and wherein identifying the resource utilization threshold comprises receiving a resource utilization threshold indicative of an amount of data storage to be used by the logic portion.

Example 26 includes the subject matter of any of Examples 16-25, and wherein identifying the resource utilization threshold comprises receiving a resource utilization threshold indicative of an amount of network bandwidth to be used by the logic portion.

Example 27 includes the subject matter of any of Examples 16-26, and wherein identifying the resource utilization threshold comprises receiving an identifier of a class of service associated with an amount of a resource to be used by the logic portion.

Example 28 includes the subject matter of any of Examples 16-27, and wherein identifying the resource utilization threshold comprises receiving a request to register a resource utilization monitor to monitor a utilization of one or more of the resources by the logic portion.

Example 29 includes the subject matter of any of Examples 16-28, and wherein limiting the utilization of the one or more resources comprises receiving a request from the logic portion for allocation of an amount of a resource; determining whether the requested amount is less than or equal to the resource utilization threshold; and allocating, in response to a determination that the requested amount is less than or equal to the resource utilization threshold, the requested amount to the logic portion.

Example 30 includes the subject matter of any of Examples 16-29, and further including determining, by the accelerator, whether less than the resource utilization threshold is presently utilized by the logic portion; and determining, by the accelerator and in response to a determination that less than the resource utilization threshold is presently utilized by the logic portion, that the resource utilization threshold is not satisfied.

Example 31 includes one or more machine-readable storage media comprising a plurality of instructions stored thereon that, in response to being executed, cause an accelerator to perform the method of any of Examples 16-30.

Example 32 includes an accelerator comprising means for performing the method of any of Examples 16-30.

Example 33 includes an accelerator to dynamically manage the utilization of shared resources within the accelerator, the accelerator comprising network communicator circuitry to receive a workload to be executed by the accelerator; workload executor circuitry to execute the workload with a logic portion of a plurality of logic portions of the accelerator; and resource allocator circuitry to (i) identify a resource utilization threshold associated with one or more shared resources of the accelerator to be used by the logic portion in the execution of the workload, (ii) limit, as a function of the resource utilization threshold, the utilization of the one or more shared resources by the logic portion as the logic portion executes the workload, and (iii) adjust, subsequent to the limiting of the utilization, the resource utilization threshold as the workload is executed.

Example 34 includes the subject matter of Example 33, and further including resource utilization monitor circuitry to monitor the resource utilization by the logic portion as the workload is executed; and wherein the network communicator circuitry is further to report the resource utilization to another device.

Example 35 includes the subject matter of any of Examples 33 and 34, and wherein the resource utilization monitor circuitry is further to determine whether the present resource utilization satisfies the resource utilization threshold associated with the corresponding resources; and to report the present resource utilization to another device comprises to report the present resource utilization in response to a determination that the present resource utilization does not satisfy the resource utilization threshold.

Example 36 includes the subject matter of any of Examples 33-35, and wherein to adjust the resource utilization threshold comprises to receive an adjustment to the resource utilization threshold from the other device; and apply the adjustment to the resource utilization threshold.

Example 37 includes the subject matter of any of Examples 33-36, and wherein to receive the workload comprises to receive a bit stream indicative of the workload to be accelerated.

Example 38 includes the subject matter of any of Examples 33-37, and wherein to receive the workload comprises to receive a designation of a logic portion to execute the workload.

Example 39 includes the subject matter of any of Examples 33-38, and wherein to identify the resource utilization threshold comprises to receive resource utilization threshold data indicative of the resource utilization threshold from an orchestrator server.

Example 40 includes the subject matter of any of Examples 33-39, and wherein to identify the resource utilization threshold comprises to receive resource utilization threshold data indicative of the resource utilization threshold from a processor assigned to execute a portion of the workload.

Example 41 includes the subject matter of any of Examples 33-40, and wherein to identify the resource utilization threshold comprises to receive a resource utilization threshold indicative of an amount of memory to be used by the logic portion.

Example 42 includes the subject matter of any of Examples 33-41, and wherein to identify the resource utilization threshold comprises to receiving a resource utilization threshold indicative of an amount of data storage to be used by the logic portion.

Example 43 includes the subject matter of any of Examples 33-42, and wherein to identify the resource utilization threshold comprises to receive a resource utilization threshold indicative of an amount of network bandwidth to be used by the logic portion.

Example 44 includes the subject matter of any of Examples 33-43, and wherein to identify the resource utilization threshold comprises to receive an identifier of a class of service associated with an amount of a resource to be used by the logic portion.

Example 45 includes the subject matter of any of Examples 33-44, and wherein to identify the resource utilization threshold comprises to receive a request to register a resource utilization monitor to monitor a utilization of one or more of the resources by the logic portion.

Example 46 includes the subject matter of any of Examples 33-45, and wherein to limit the utilization of the one or more resources comprises to receive a request from the logic portion for allocation of an amount of a resource; determine whether the requested amount is less than or equal to the resource utilization threshold; and allocate, in response to a determination that the requested amount is less than or equal to the resource utilization threshold, the requested amount to the logic portion.

Example 47 includes the subject matter of any of Examples 33-46, and wherein to determine whether the resource utilization threshold is satisfied comprises to determine whether less than the resource utilization threshold is presently utilized by the logic portion; and determine, in response to a determination that less than the resource utilization threshold is presently utilized by the logic portion, that the resource utilization threshold is not satisfied.

Example 48 includes an accelerator to dynamically manage the utilization of shared resources within the accelerator, the accelerator comprising circuitry for receiving a workload to be executed by a logic portion of a plurality of logic portions of the accelerator; means for identifying a resource utilization threshold associated with one or more shared resources of the accelerator to be used by the logic portion in the execution of the workload; means for limiting, as a function of the resource utilization threshold, the utilization of the one or more shared resources by the logic portion as the logic portion executes the workload; and means for adjusting, subsequent to the limiting of the utilization, the resource utilization threshold as the workload is executed.

Example 49 includes the subject matter of Example 48, and further including circuitry for monitoring the resource utilization by the logic portion as the workload is executed; and circuitry for reporting the resource utilization to another device.

Example 50 includes the subject matter of any of Examples 48 and 49, and further including circuitry for determining whether the present resource utilization satisfies the resource utilization threshold associated with the corresponding resources; wherein the circuitry for reporting the present resource utilization to another device comprises circuitry for reporting the present resource utilization in response to a determination that the present resource utilization does not satisfy the resource utilization threshold.

Example 51 includes the subject matter of any of Examples 48-50, and wherein the means for adjusting the resource utilization threshold comprises circuitry for receiving an adjustment to the resource utilization threshold from the other device; and circuitry for applying the adjustment to the resource utilization threshold.

Example 52 includes the subject matter of any of Examples 48-51, and wherein the circuitry for receiving the workload comprises circuitry for receiving a bit stream indicative of the workload to be accelerated.

Example 53 includes the subject matter of any of Examples 48-52, and wherein the circuitry for receiving the workload comprises circuitry for receiving a designation of a logic portion to execute the workload.

Example 54 includes the subject matter of any of Examples 48-53, and wherein means for identifying the resource utilization threshold comprises circuitry for receiving resource utilization threshold data indicative of the resource utilization threshold from an orchestrator server.

Example 55 includes the subject matter of any of Examples 48-54, and wherein the means for identifying the resource utilization threshold comprises circuitry for receiving resource utilization threshold data indicative of the resource utilization threshold from a processor assigned to execute a portion of the workload.

Example 56 includes the subject matter of any of Examples 48-55, and wherein the means for identifying the resource utilization threshold comprises circuitry for receiving a resource utilization threshold indicative of an amount of memory to be used by the logic portion.

Example 57 includes the subject matter of any of Examples 48-56, and wherein the means for identifying the resource utilization threshold comprises circuitry for receiving a resource utilization threshold indicative of an amount of data storage to be used by the logic portion.

Example 58 includes the subject matter of any of Examples 48-57, and wherein the means for identifying the resource utilization threshold comprises circuitry for receiving a resource utilization threshold indicative of an amount of network bandwidth to be used by the logic portion.

Example 59 includes the subject matter of any of Examples 48-58, and wherein the means for identifying the resource utilization threshold comprises circuitry for receiving an identifier of a class of service associated with an amount of a resource to be used by the logic portion.

Example 60 includes the subject matter of any of Examples 48-59, and wherein the means for identifying the resource utilization threshold comprises circuitry for receiving a request to register a resource utilization monitor to monitor a utilization of one or more of the resources by the logic portion.

Example 61 includes the subject matter of any of Examples 48-60, and wherein the means for limiting the utilization of the one or more resources comprises circuitry for receiving a request from the logic portion for allocation of an amount of a resource; circuitry for determining whether the requested amount is less than or equal to the resource utilization threshold; and circuitry for allocating, in response to a determination that the requested amount is less than or equal to the resource utilization threshold, the requested amount to the logic portion.

Example 62 includes the subject matter of any of Examples 48-61, and further including circuitry for determining whether less than the resource utilization threshold is presently utilized by the logic portion; and circuitry for determining, in response to a determination that less than the resource utilization threshold is presently utilized by the logic portion, that the resource utilization threshold is not satisfied.

Example 63 includes a compute device to manage the dynamic allocation of resources by an accelerator, the compute device comprising one or more processors; one or more memory devices having stored therein a plurality of instructions that, when executed by the one or more processors, cause the compute device to assign a workload to be accelerated by a logic portion of a plurality of logic portions of an accelerator; send resource utilization threshold data indicative of a resource utilization threshold of one or more resources of the accelerator to be used by the logic portion in the execution of the workload; receive resource utilization data indicative of a present resource utilization of the one or more resources by the logic portion as the workload is executed; determine an adjustment to the resource utilization threshold; and send the adjustment to the accelerator to adjust the allocation of the one or more resources among the logic portions of the accelerator as the workload is executed.

Example 64 includes the subject matter of Example 63, and wherein to assign a workload comprises to send a bit stream to the accelerator, wherein the bit stream is indicative of the workload to be executed.

Example 65 includes the subject matter of any of Examples 63 and 64, and wherein to assign a workload comprises to send a designation of one of a plurality of the logic portions of the accelerator to execute the workload.

Example 66 includes the subject matter of any of Examples 63-65, and wherein to send the resource utilization threshold data comprises to send a resource utilization threshold associated with a service level agreement assigned to the workload.

Example 67 includes the subject matter of any of Examples 63-66, and wherein to send the resource utilization threshold data comprises to send a resource utilization threshold indicative of an amount of memory to be used by the logic portion.

Example 68 includes the subject matter of any of Examples 63-67, and wherein to send the resource utilization threshold data comprises to send a resource utilization threshold indicative of an amount of data storage to be used by the logic portion.

Example 69 includes the subject matter of any of Examples 63-68, and wherein to send the resource utilization threshold data comprises to send a resource utilization threshold indicative of an amount of network bandwidth to be used by the logic portion.

Example 70 includes the subject matter of any of Examples 63-69, and wherein to send the resource utilization threshold data comprises to send an identifier of a class of service associated with an amount of a resource to be used by the logic portion.

Example 71 includes the subject matter of any of Examples 63-70, and wherein to send the resource utilization threshold data comprises to send a request to register a resource utilization monitor to monitor a utilization of one or more of the resources by the logic portion.

Example 72 includes the subject matter of any of Examples 63-71, and wherein the plurality of instructions, when executed, further cause the compute device to determine whether the present resource utilization satisfies the resource utilization threshold associated with the resource; and wherein to determine an adjustment to the resource utilization threshold comprises to determine the adjustment in response to a determination that the present resource utilization does not satisfy the resource utilization threshold.

Example 73 includes a method for managing the dynamic allocation of resources by an accelerator, the method comprising assigning, by the compute device, a workload to be accelerated by a logic portion of a plurality of logic portions of an accelerator; sending, by the compute device, resource utilization threshold data indicative of a resource utilization threshold of one or more resources of the accelerator to be used by the logic portion in the execution of the workload; receiving, by the compute device, resource utilization data indicative of a present resource utilization of the one or more resources by the logic portion as the workload is executed; determining, by the compute device, an adjustment to the resource utilization threshold; and sending, by the compute device, the adjustment to the accelerator to adjust the allocation of the one or more resources among the logic portions of the accelerator as the workload is executed.

Example 74 includes the subject matter of Example 73, and wherein assigning a workload comprises sending a bit stream to the accelerator, wherein the bit stream is indicative of the workload to be executed.

Example 75 includes the subject matter of any of Examples 73 and 74, and wherein assigning a workload comprises sending a designation of one of a plurality of the logic portions of the accelerator to execute the workload.

Example 76 includes the subject matter of any of Examples 73-75, and wherein sending the resource utilization threshold data comprises sending a resource utilization threshold associated with a service level agreement assigned to the workload.

Example 77 includes the subject matter of any of Examples 73-76, and wherein sending the resource utilization threshold data comprises sending a resource utilization threshold indicative of an amount of memory to be used by the logic portion.

Example 78 includes the subject matter of any of Examples 73-77, and wherein sending the resource utilization threshold data comprises sending a resource utilization threshold indicative of an amount of data storage to be used by the logic portion.

Example 79 includes the subject matter of any of Examples 73-78, and wherein sending the resource utilization threshold data comprises sending a resource utilization threshold indicative of an amount of network bandwidth to be used by the logic portion.

Example 80 includes the subject matter of any of Examples 73-79, and wherein sending the resource utilization threshold data comprises sending an identifier of a class of service associated with an amount of a resource to be used by the logic portion.

Example 81 includes the subject matter of any of Examples 73-80, and wherein sending the resource utilization threshold data comprises sending a request to register a resource utilization monitor to monitor a utilization of one or more of the resources by the logic portion.

Example 82 includes the subject matter of any of Examples 73-81, and further including determining, by the compute device, whether the present resource utilization satisfies the resource utilization threshold associated with the resource; and wherein determining an adjustment to the resource utilization threshold comprises determining the adjustment in response to a determination that the present resource utilization does not satisfy the resource utilization threshold.

Example 83 includes one or more machine-readable storage media comprising a plurality of instructions stored thereon that, in response to being executed, cause a compute device to perform the method of any of Examples 73-82.

Example 84 includes a compute device comprising means for performing the method of any of Examples 73-82.

Example 85 includes a compute device comprising one or more processors; one or more memory devices having stored therein a plurality of instructions that, when executed by the one or more processors, cause the compute device to perform the method of any of Examples 73-82.

Example 86 includes a compute device to manage the dynamic allocation of resources by an accelerator, the compute device comprising resource manager circuitry to assign a workload to be accelerated by a logic portion of a plurality of logic portions of an accelerator; and network communicator circuitry to (i) send resource utilization threshold data indicative of a resource utilization threshold of one or more resources of the accelerator to be used by the logic portion in the execution of the workload, (ii) receive resource utilization data indicative of a present resource utilization of the one or more resources by the logic portion as the workload is executed; wherein the resource manager circuitry is further to determine an adjustment to the resource utilization threshold, and the network communicator circuitry is further to send the adjustment to the accelerator to adjust the allocation of the one or more resources among the logic portions of the accelerator as the workload is executed.

Example 87 includes the subject matter of Example 86, and wherein to assign a workload comprises to send a bit stream to the accelerator, wherein the bit stream is indicative of the workload to be executed.

Example 88 includes the subject matter of any of Examples 86 and 87, and wherein to assign a workload comprises to send a designation of one of a plurality of the logic portions of the accelerator to execute the workload.

Example 89 includes the subject matter of any of Examples 86-88, and wherein to send the resource utilization threshold data comprises to send a resource utilization threshold associated with a service level agreement assigned to the workload.

Example 90 includes the subject matter of any of Examples 86-89, and wherein to send the resource utilization threshold data comprises to send a resource utilization threshold indicative of an amount of memory to be used by the logic portion.

Example 91 includes the subject matter of any of Examples 86-90, and wherein to send the resource utilization threshold data comprises to send a resource utilization threshold indicative of an amount of data storage to be used by the logic portion.

Example 92 includes the subject matter of any of Examples 86-91, and wherein to send the resource utilization threshold data comprises to send a resource utilization threshold indicative of an amount of network bandwidth to be used by the logic portion.

Example 93 includes the subject matter of any of Examples 86-92, and wherein to send the resource utilization threshold data comprises to send an identifier of a class of service associated with an amount of a resource to be used by the logic portion.

Example 94 includes the subject matter of any of Examples 86-93, and wherein to send the resource utilization threshold data comprises to send a request to register a resource utilization monitor to monitor a utilization of one or more of the resources by the logic portion.

Example 95 includes the subject matter of any of Examples 86-94, and wherein the resource manager circuitry is further to determine whether the present resource utilization satisfies the resource utilization threshold associated with the resource; and wherein to determine an adjustment to the resource utilization threshold comprises to determine the adjustment in response to a determination that the present resource utilization does not satisfy the resource utilization threshold.

Example 96 includes a compute device for managing the dynamic allocation of resources by an accelerator, the compute device comprising circuitry for assigning a workload to be accelerated by a logic portion of a plurality of logic portions of an accelerator; circuitry for sending resource utilization threshold data indicative of a resource utilization threshold of one or more resources of the accelerator to be used by the logic portion in the execution of the workload; circuitry for receiving resource utilization data indicative of a present resource utilization of the one or more resources by the logic portion as the workload is executed; means for determining an adjustment to the resource utilization threshold; and circuitry for sending the adjustment to the accelerator to adjust the allocation of the one or more resources among the logic portions of the accelerator as the workload is executed.

Example 97 includes the subject matter of Example 96, and wherein the circuitry for assigning a workload comprises circuitry for sending a bit stream to the accelerator, wherein the bit stream is indicative of the workload to be executed.

Example 98 includes the subject matter of any of Examples 96 and 97, and wherein the circuitry for assigning a workload comprises circuitry for sending a designation of one of a plurality of the logic portions of the accelerator to execute the workload.

Example 99 includes the subject matter of any of Examples 96-98, and wherein the circuitry for sending the resource utilization threshold data comprises circuitry for sending a resource utilization threshold associated with a service level agreement assigned to the workload.

Example 100 includes the subject matter of any of Examples 96-99, and wherein the circuitry for sending the resource utilization threshold data comprises circuitry for sending a resource utilization threshold indicative of an amount of memory to be used by the logic portion.

Example 101 includes the subject matter of any of Examples 96-100, and wherein the circuitry for sending the resource utilization threshold data comprises circuitry for sending a resource utilization threshold indicative of an amount of data storage to be used by the logic portion.

Example 102 includes the subject matter of any of Examples 96-101, and wherein the circuitry for sending the resource utilization threshold data comprises circuitry for sending a resource utilization threshold indicative of an amount of network bandwidth to be used by the logic portion.

Example 103 includes the subject matter of any of Examples 96-102, and wherein the circuitry for sending the resource utilization threshold data comprises circuitry for sending an identifier of a class of service associated with an amount of a resource to be used by the logic portion.

Example 104 includes the subject matter of any of Examples 96-103, and wherein the circuitry for sending the resource utilization threshold data comprises circuitry for sending a request to register a resource utilization monitor to monitor a utilization of one or more of the resources by the logic portion.

Example 105 includes the subject matter of any of Examples 96-104, and further including circuitry for determining whether the present resource utilization satisfies the resource utilization threshold associated with the resource; and wherein the means for determining an adjustment to the resource utilization threshold comprises means for determining the adjustment in response to a determination that the present resource utilization does not satisfy the resource utilization threshold.

The invention claimed is:

1. An accelerator device comprising:
a field programmable gate array (FPGA) that includes multiple logic portions capable of separately executing a respective workload, each respective workload received from at least one compute device assigned to execute an application;
at least one shared resource for use by the multiple logic portions to separately execute respective workloads;
communication circuitry to receive a first workload from a first compute device assigned to execute a first application, the first workload to be executed by a first logic portion of the multiple logic portions; and
resource allocation circuitry to;
identify a first resource utilization amount associated with the at least one shared resource to be used by the first logic portion to execute the first workload,
limit, as a function of the first resource utilization amount, a utilization of the at least one shared resource by the first logic portion to not exceed the first resource utilization amount as the first logic portion executes the first workload, and
adjust the first resource utilization amount to a second resource utilization amount as the first workload is executed by the first logic portion.

2. The accelerator device of claim 1, further comprising a resource monitor circuitry to monitor the utilization of the at least one shared resource by the first logic portion as the first workload is executed and report the utilization to another device.

3. The accelerator device of claim 2, wherein the resource monitor circuitry is further to determine whether the utilization of the at least one shared resource satisfies the first resource utilization amount and wherein to report the utilization to another device comprises to report the utilization in response to a determination that the utilization does not satisfy the first resource utilization amount.

4. The accelerator device of claim 3, wherein to adjust the first resource utilization amount comprises to:

receive an adjustment to the first resource utilization amount from the other device; and
apply the adjustment to the first resource utilization amount to determine the second resource utilization amount.

5. The accelerator device of claim 1, wherein to receive the first workload comprises to receive a bit stream indicative of the first workload to be accelerated.

6. The accelerator device of claim 1, wherein to receive the first workload comprises to receive a designation of a logic portion to execute the first workload.

7. The accelerator device of claim 1, wherein to identify the first resource utilization amount comprises to receive a resource utilization amount indicative of an amount of memory to be used by the first logic portion.

8. The accelerator device of claim 1, wherein to identify the first resource utilization amount comprises to receive a resource utilization amount indicative of an amount of data storage to be used by the first logic portion.

9. The accelerator device of claim 1, wherein to identify the first resource utilization amount comprises to receive a resource utilization amount of an amount of network bandwidth to be used by the first logic portion.

10. The accelerator device of claim 1, wherein to identify the first resource utilization amount comprises to receive an identifier of a class of service associated with an amount of a resource to be used by the first logic portion.

11. The accelerator device of claim 1, further comprising:
the communication circuitry to receive a second workload from a second compute device assigned to execute a second application, the second workload to be executed by a second logic portion of the multiple logic portions; and
the resource allocation circuitry to;
identify a third resource utilization amount associated with the at least one shared resource to be used by the second logic portion to execute the second workload,
limit, as a function of the third resource utilization amount, a utilization of the at least one shared resource by the second logic portion to not exceed the third resource utilization amount as the second logic portion executes the second workload, and
adjust the third resource utilization amount to a fourth resource utilization amount as the second workload is executed by the second logic portion.

12. One or more non-transitory machine-readable storage media comprising a plurality of instructions stored thereon that, in response to being executed, cause an accelerator device to:
receive a first workload from a first compute device assigned to execute a first application, the first workload to be executed by a first logic portion of a plurality of logic portions of a field programmable gate array (FPGA) of the accelerator device, the plurality of logic portions capable of separately executing a respective workload, each respective workload received from at least one compute device assigned to execute an application, the at least one compute device to include the first compute device;
identify a first resource utilization amount associated with at least one shared resource of the accelerator device to be used by the first logic portion to execute the first workload;
limit, as a function of the first resource utilization amount, a utilization of the at least one shared resource by the first logic portion to not exceed the first resource utilization amount as the first logic portion executes the first workload; and
adjust, subsequent to the limiting of the utilization, the first resource utilization amount to a second resource utilization amount as the first workload is executed by the first logic portion.

13. The one or more non-transitory machine-readable storage media of claim 12, wherein the plurality of instructions, when executed, further cause the accelerator device to:
monitor the utilization of the at least one shared resource by the first logic portion as the first workload is executed; and
report the utilization to another device.

14. The one or more non-transitory machine-readable storage media of claim 13, wherein the plurality of instructions, when executed, further cause the accelerator device to:
determine whether the utilization of the at least one shared resource satisfies the first resource utilization amount;
wherein to report the utilization to another device comprises to report the utilization in response to a determination that the utilization does not satisfy the first resource utilization amount.

15. The one or more non-transitory machine-readable storage media of claim 14, to adjust the first resource utilization amount comprises to:
receive an adjustment to the first resource utilization amount from the other device; and
apply the adjustment to the first resource utilization amount to determine the second resource utilization amount.

16. The one or more non-transitory machine-readable storage media of claim 12, wherein to receive the first workload comprises to receive a bit stream indicative of the first workload to be accelerated.

17. The one or more non-transitory machine-readable storage media of claim 12, wherein to receive the first workload comprises to receive a designation of a logic portion to execute the first workload.

18. The one or more non-transitory machine-readable storage media of claim 12, wherein to identify the first resource utilization amount comprises to receive resource utilization data indicative of the first resource utilization amount from an orchestrator server.

19. The one or more non-transitory machine-readable storage media of claim 12, wherein to identify the first resource utilization amount comprises to receive resource utilization threshold data indicative of the first resource utilization amount from a processor of the first compute device that is assigned to execute a portion of the first workload.

20. The one or more non-transitory machine-readable storage media of claim 12, wherein to identify the first resource utilization amount comprises to receive a resource utilization amount indicative of an amount of memory to be used by the first logic portion.

21. The one or more non-transitory machine-readable storage media of claim 12, wherein to identify the first resource utilization amount comprises to receive a resource utilization amount indicative of an amount of data storage to be used by the first logic portion.

22. The one or more non-transitory machine-readable storage media of claim 12, wherein to identify the first resource utilization amount comprises to receive a resource utilization amount of an amount of network bandwidth to be used by the first logic portion.

23. The one or more non-transitory machine-readable storage media of claim 12, wherein to identify the first resource utilization amount comprises to receive an identifier of a class of service associated with an amount of a resource to be used by the first logic portion.

24. The one or more non-transitory machine-readable storage media of claim 12, wherein the plurality of instructions, when executed, further cause the accelerator device to:
receive a second workload from a second compute device assigned to execute a second application, the second workload to be executed by a second logic portion of the plurality of logic portions;
identify a third resource utilization amount associated with the at least one shared resource to be used by the second logic portion to execute the second workload,
limit, as a function of the third resource utilization amount, a utilization of the at least one shared resource by the second logic portion to not exceed the third resource utilization amount as the second logic portion executes the second workload, and
adjust the third resource utilization amount to a fourth resource utilization amount as the second workload is executed by the second logic portion.

25. An accelerator device comprising:
means for receiving a first workload from a first compute device assigned to execute a first application, the first workload to be executed by a first logic portion of a plurality of logic portions of a field programmable gate array (FPGA) of the accelerator device, the plurality of logic portions capable of separately executing a respective workload, each respective workload received from at least one compute device assigned to execute an application, the at least one compute device to include the first compute device;
means for identifying a first resource utilization amount associated with at least one shared resource of the accelerator device to be used by the first logic portion to execute the first workload;
means for limiting, as a function of the first resource utilization amount, a utilization of the at least one shared resource by the first logic portion to not exceed the first resource utilization amount as the first logic portion executes the first workload; and
means for adjusting, subsequent to the limiting of the utilization, the first resource utilization amount to a second resource utilization amount as the first workload is executed by the first logic portion.

26. A method comprising:
receiving, by an accelerator device, a first workload from a first compute device assigned to execute a first application, the first workload to be executed by a first logic portion of a plurality of logic portions of a field programmable gate array (FPGA) of the accelerator device, the plurality of logic portions capable of separately executing a respective workload, each respective workload received from at least one compute device assigned to execute an application, the at least one compute device to include the first compute device;
identifying a first resource utilization amount associated with at least one shared resource of the accelerator device to be used by the first logic portion to execute the first workload;
limiting, as a function of the first resource utilization amount, a utilization of the at least one shared resource by the first logic portion to not exceed the first resource utilization amount as the first logic portion executes the first workload; and
adjusting, subsequent to the limiting of the utilization, the first resource utilization amount to a second resource utilization amount as the first workload is executed by the first logic portion.

27. The method of claim 26, further comprising:
monitoring the utilization of the at least one shared resource by the first logic portion as the first workload is executed; and
reporting the utilization to another device.

28. The method of claim 27, further comprising:
determining, whether the utilization of the at least one shared resource satisfies the first resource utilization amount;
wherein reporting utilization to another device comprises to report the utilization in response to a determination that the utilization does not satisfy the first resource utilization amount.

29. The method of claim 26, further comprising:
receiving a second workload from a second compute device assigned to execute a second application, the second workload to be executed by a second logic portion of the plurality of logic portions;
identifying a third resource utilization amount associated with the at least one shared resource to be used by the second logic portion to execute the second workload,
limiting, as a function of the third resource utilization amount, a utilization of the at least one shared resource by the second logic portion to not exceed the third resource utilization amount as the second logic portion executes the second workload, and
adjusting the third resource utilization amount to a fourth resource utilization amount as the second workload is executed by the second logic portion.

* * * * *